United States Patent
Wu

(10) Patent No.: US 8,413,291 B2
(45) Date of Patent: Apr. 9, 2013

(54) BONELESS WIPER BLADE

(75) Inventor: Sheng-Zhu Wu, Fujian (CN)

(73) Assignee: Xiamen Meto Auto Parts Co., Ltd., Xiamen, Fujian (CN)

( * ) Notice: Subject to any disclaimer, the term of this patent is extended or adjusted under 35 U.S.C. 154(b) by 821 days.

(21) Appl. No.: 12/557,397

(22) Filed: Sep. 10, 2009

(65) Prior Publication Data

US 2011/0056041 A1    Mar. 10, 2011

(51) Int. Cl.
 *B60S 1/38* (2006.01)
 *B60S 1/40* (2006.01)
(52) U.S. Cl.
 USPC ............... 15/250.201; 15/250.43; 15/250.32
(58) Field of Classification Search ............ 15/250.201, 15/250.43, 250.44, 250.361, 250.451–250.454, 15/250.32
 See application file for complete search history.

(56) References Cited

U.S. PATENT DOCUMENTS

| | | | | |
|---|---|---|---|---|
| 2,920,336 A * | 1/1960 | Anderson | ............... | 15/250.453 |
| 3,192,551 A * | 7/1965 | Appel | .................... | 15/250.43 |
| 6,161,249 A * | 12/2000 | Hussaini | ................. | 15/250.32 |
| 7,484,264 B2 * | 2/2009 | Kraemer et al. | ......... | 15/250.201 |
| 2004/0181894 A1 * | 9/2004 | Lee et al. | .................. | 15/250.201 |
| 2005/0166349 A1 * | 8/2005 | Nakano et al. | ............ | 15/250.201 |
| 2006/0282973 A1 * | 12/2006 | Chang | ...................... | 15/250.201 |

FOREIGN PATENT DOCUMENTS

FR     2907737     *    5/2008

* cited by examiner

*Primary Examiner* — Gary Graham

(57) ABSTRACT

The prevent invention discloses a boneless wiper blade, which mainly consists of a pivot socket, two end ferrules, spring steel sheet and rubber strip, wherein the spring steel sheet is used to support and fix the rubber strip, and the pivot socket, on which the connecting adaptors are installed to connect with wiper arms, is mounted on the center of the spring steel sheet and the rubber strip, with end ferrules mounted at both ends of them. The upper part of the wind-pressure sheathes featuring specially curved surface is designed to prevent the wiper blade from lifting off from the surface of the windshield at highway speeds. The said spring steel sheet is so parabolically designed that the rubber strip can firmly and closely contact the various windshield glasses. Both connecting structures between the connecting adaptor and the pivot socket, and the pivot socket and the spring steel sheet and rubber strip are removable, it is same with the connecting structure between end ferrule and spring steel sheet and rubber strip. In this way, it is easy to assemble, dismount and replace them, and even facilitate use of them. The wiper blade has strong compatibility in that the pivot socket can be mounted with various kinds of connecting adaptors to be compatible with multiple wiper arm configurations.

5 Claims, 35 Drawing Sheets

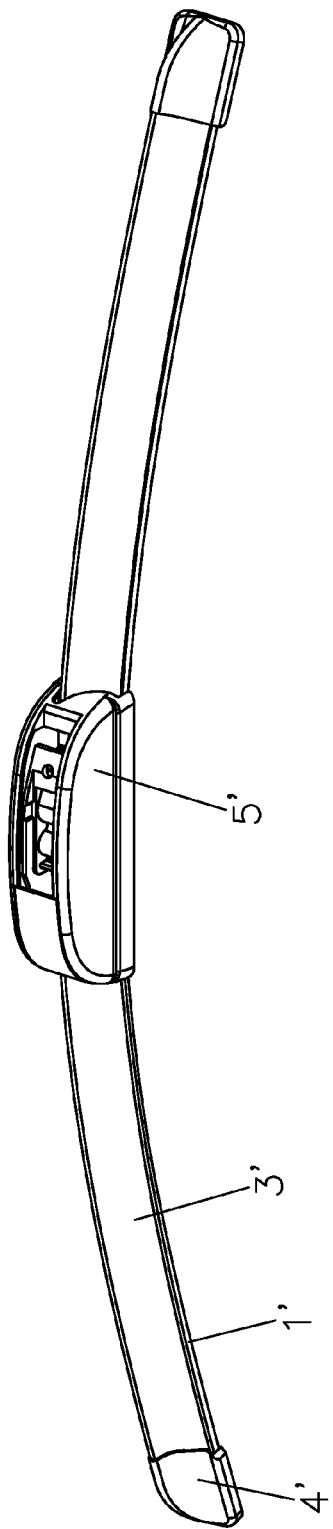
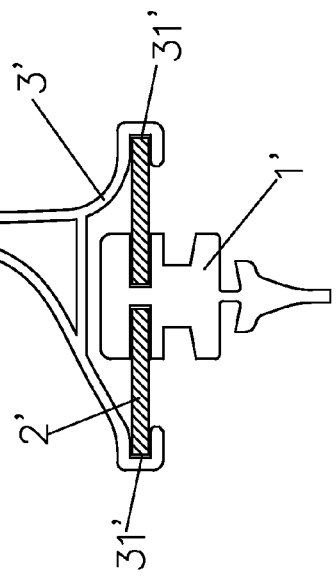
FIG. 1
Prior Art
FIG. 2
Prior Art

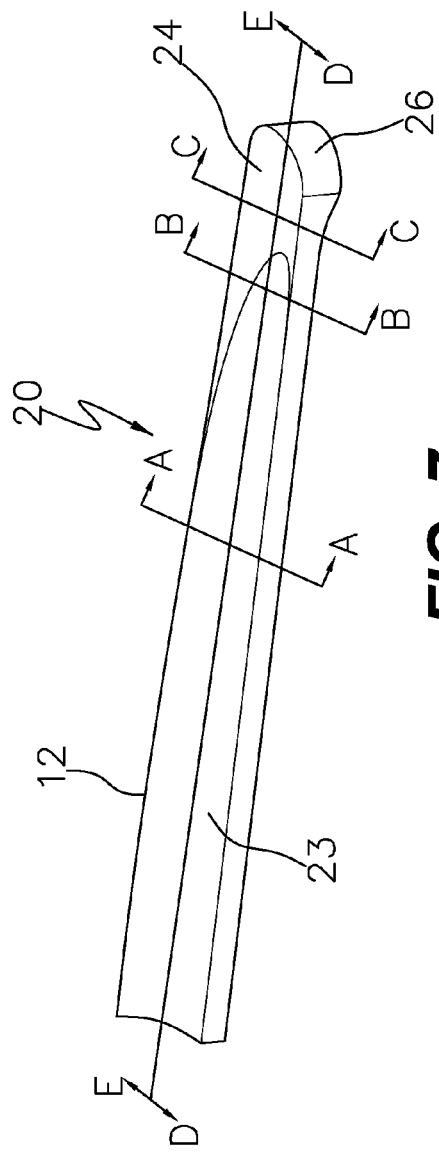
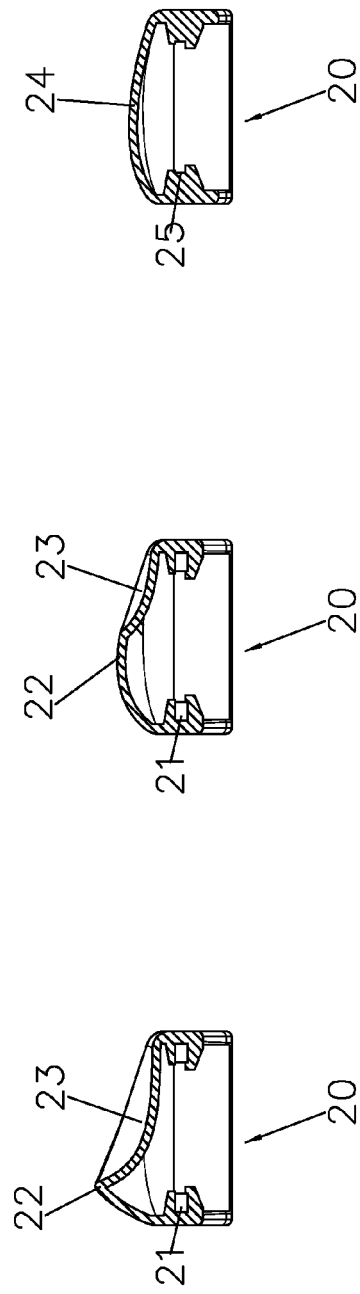
FIG. 7
FIG. 7A
FIG. 7B
FIG. 7C

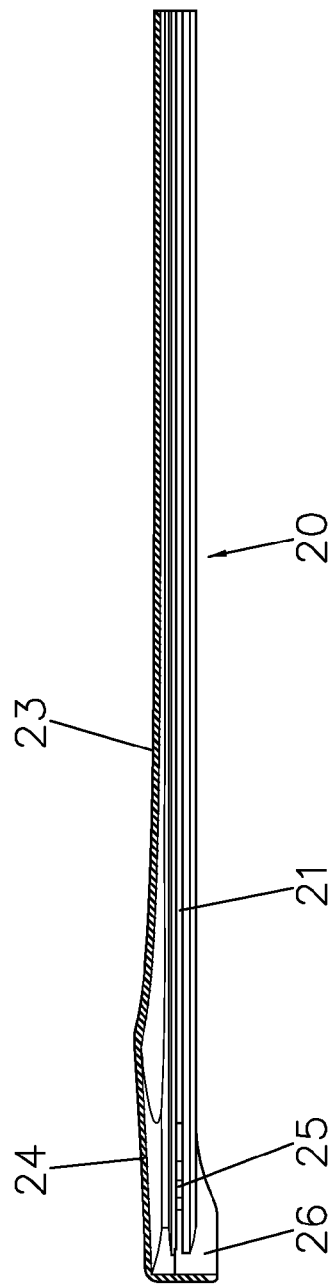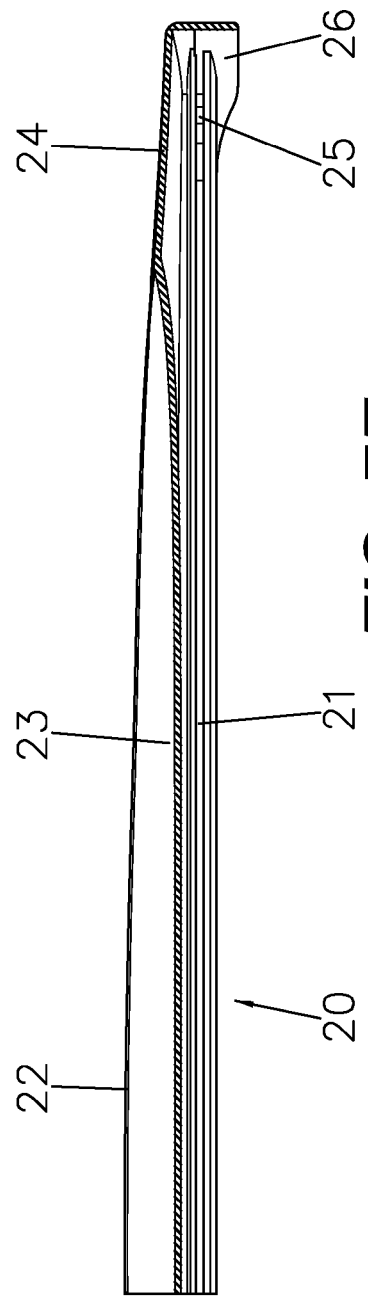

BONELESS WIPER BLADE

FIELD OF THE INVENTION

This invention relates to a wiper blade used for the windshield glass, and more particularly, to a boneless wiper blade.

DESCRIPTION OF THE RELATED ART

Windshield wiper blades for cars and vehicles are mounted to remove rainwater or impurity to prevent them from obstructing drivers' sight at the time of driving. Although they are very small relative to a car or vehicle, they play vital role in them.

Generally, the wiper blade is divided into bone wiper blade and boneless wiper blade. As to bone wiper blade, the wiper blade structure is connected with wiper arms through a framework. However, the wiper blade structure is stressed by the framework at multiple points, the rubber strip for the wiper blade cannot always firmly and closely contact windshield glass, resulting in poorer performance of the wiper blade. As to boneless wiper blade, it connect with the wiper arm through the connecting device, leaving no part but the connecting device at the middle portion of the wiper blade structure stressed, which results in more firm and close contacting of the rubber strip with windshield glass, and better performance of the wiper blade accordingly.

The present invention relates to a boneless wiper blade. For information about the typical structure for the boneless wiper blade, it is advisable to refer to the Chinese utility model patent CN200992193Y (publication number) along with FIGS. 1 and 2. As shown in the figures, the said wiper blade generally consists of Rubber Strip 1', Spring Steel Sheet 2', End Ferrule 3', end buckle 4' and connecting device 5', wherein, the said rubber strip 1' is clamped and fixed by the spring steel sheet 2'; and then the groove 31' at the inner side of the end ferrule 3' clamps the both sides of the spring steel sheet 2'; middle portion of the rubber strip 1' and the spring steel sheet 2' is fixed by the connecting device 5', and then the rubber strip 1', spring steel sheet 2' and both ends of the end ferrule 3' are fixed by the end buckle 4'.

Drawbacks of present boneless wipe blade structures are as follows,

Firstly, drawbacks of the end ferrule:

As shown in the FIG. 2, the exterior side of the said end ferrule 3' has a upwardly-elevating crest section 32' whose both sides are formed into a slope. Presently, the crest section 32' of the end ferrule 3' is sometimes set symmetrically, and sometimes set asymmetrically; and the slope at both sides of the crest section 32' features varies shapes. Whatever shape of exterior profile of the present end ferrule is taken, its purpose is to deflect air current to smoothly flow along the slope at both sides of the crest section 32' so as to suppress shaking of the wiper blade while at highway speeds.

As the structure of the crest section of the exterior side of the present end ferrule and deflecting slope is run through the whole end ferrule and even the exterior profile of the end buckle at both ends of the wiper blade for securing purpose also follows the shape of the end ferrule, therefore, the end ferrule for the present boneless wiper blade only addresses the problem of preventing the wiper blade from pulling by deflecting air current. However, the wiper blade would be lift off from the windshield glass or lift off from its middle portion at the highway speeds. As a result, the rubber strip for the wiper blade would not firmly and closely contact the windshield glass fully or partially, resulting in poorer performance of the wiper blade.

Secondly, drawbacks of the spring steel sheet:

The spring steel sheet providing support to the rubber strip in the present boneless wiper blade is shown in FIG. 2, which includes two pieces of spring steel sheet 2' clamping, supporting and fixing rubber strip 1'. It is also okay to place one piece of spring steel sheet over the rubber strip, and connect the spring steel sheet with the rubber strip by auxiliary parts. Whatever two pieces or one piece of spring steel sheet are (is) taken, their (its) vertical shape are (is) symmetrically arched, which can generate spring force. When the spring force is applied to the middle portion of the spring steel sheet, the latter will be pressed against the windshield glass. Nevertheless, when the whole arc shape is flat, no balanced pressing force will be generated to press against the glass, which will result in poorer performance of the wiper blade. To address the problem, two solutions are delivered for the current product. The one solution is shown in FIG. 3A and FIG. 3B, wherein the said spring steel sheet 2' is designed in such way that the middle portion is thicker or wider than both ends. Through such design and proper proportion of arc line to height, rating pressing force is generated. When the spring force is applied to the middle portion of the spring steel sheet, the sheet will generate more balanced pressing force, resulting in improving wiper blade performance. However, the design has its own drawback: it is difficult to assure consistency of products when mass production in that it is impossible to keep under control the rating pressing force generated by such design and proper proportion of arc line to height. The other solution is design the spring steel sheet into multiple-section arc with various curvatures. In this way, when the spring steel sheet is pressed flat at its middle portion, pressing force will be generated on the whole spring steel sheet, resulting in better performance of the wiper blade. Nevertheless, the design also bears its drawback: as shown in FIG. 3C, when the whole cambered surface is pressed flat, pressing force is generated on the whole spring steel sheet 2'. However, multiple cambered surfaces are tangent to each other, resulting in point of intersection a formed by different arc line contacting the glass, and elevation in other areas. Microscopically, wave shape is formed when the spring steel sheet is pressed flat (as shown in FIG. 3D). It is therefore impossible to generate balanced pressing force on the whole spring steel sheet 2', which reduces the performance of the rubber strip.

Thirdly, drawbacks of the connecting device:

For a boneless wiper blade, its principal part is connected with the wipe arm mounted on the windshield glass through the connecting device. Generally speaking, structure setting of the connecting device is subject to structure of the wiper arm. Whichever connecting device is taken, it typically consists of a pivot socket which mounted on the middle portion of the principal part of the wiper blade, and connecting adaptors, which are mounted on the pivot socket. They are coupled to connect with the wiper arm. Some wiper blades are provided with a outer cover outside of the connecting adaptors to house the internal structure for appearance purpose. At present, the connecting device is assembled in fixed way, where the pivot socket is welded or riveted on the principal part of the wiper blade, and the connecting adaptors are riveted on the pivot socket. For further information, see also the Chinese utility model patent No. CN201073958Y publicized on Jun. 18, 2008. For some connecting devices with a outer cover, their outer covers are often riveted to the connecting adaptors.

Given the existing fixed-type connecting device for the wiper blade, the whole wiper blade will have to be rejected when the principal part of the wiper blade or part of the connecting device is damaged, resulting in more waste. Basing on the above reason, this inventor discovers that the connecting adaptors, also the connecting part between the connecting device and wiper arm, are vulnerable to damage through long-term research. Therefore, rejection of whole wiper blade resulting from merely damage of connecting adaptors of the connecting device leads to a greater amount of waste. Similarly, there exists a problem in removing connection between the said pivot socket and principal part of the wiper blade.

Fourthly, drawback of the structure connecting end buckle and end ferrule and spring steal sheet:

The end buckle of existing wiper blades are generally connected with end ferrule and spring steel sheet in welded or riveted way. Similarly, the connection cannot be removed as abovementioned, and no damaged but all parts are replaced.

Fifthly, poor compatibility of existing wiper blade:

As each brand and model car is compatible with various structures of wiper arms, wiper blade with corresponding connecting device must be equipped with. What's more, the connecting device is connected in a fixed way, it leads to poorer compatibility of such wiper blade.

SUMMARY OF THE INVENTION

A major technical problem intended to be addressed by this invention is to deliver a boneless wiper blade, whose end ferrule can prevent wiper blade life off from the windshield glass at highway speeds.

Another technical problem intended to be addressed by this invention is to deliver a boneless wiper blade, whose spring steel sheet can facilitate closer contact between the rubber strip and windshield glass with various curved surface curvature.

An additional technical problem intended to be addressed by this invention is to deliver a boneless wiper blade, whose connecting adaptors and pivot socket, and pivot socket and spring steel sheet and rubber strip are removably connected, leading to easy assembly, removing and replacement, and easy to use as well as more compatibility of the wiper blade with multiple wiper arm structures.

An additional technical problem intended to be addressed by this invention is to deliver a boneless wiper blade, whose end ferrule is removably connected with spring steel sheet and rubber strip instead of connecting by end buckle, leading to easy assembly, removing and replacement, and even facilitate its use.

Intending to address the above-mentioned technical problems, this invention presents solutions as follows, A boneless wiper blade comprising of a pivot socket, two end ferrules, spring steel sheet and rubber strip, wherein the spring steel sheet is used to support and fix the rubber strip, and the pivot socket, on which the connecting adaptor is installed to connect with wiper arms, is installed on the center of the spring steel sheet and the rubber strip, with two end ferrules mounted at both ends of the spring steel sheet and rubber strip; the crest section of the said end ferrules is so eccentrically set that longer side of the crest section forms a inwardly curved surface; vertically, the crest section becomes lower outwardly, and the curved surface becomes higher exteriorly, resulting in integrating the crest section and inwardly-curved surface as a smooth curve.

Externally curved surface, whose cross section is upwardly convex arc-shaped, which vertically becomes higher inwardly, and finally integrates with the crest section and the curved surface, is provided at the outer end of the said end ferrules.

The said spring steel sheet is parabolic shape with gradual change curvature, and has no arch section joint; with rating elastic force for springs resulting from restricting height and curvature ratio of chord width of parabola, and by flatting the parabola by applying pressure to the middle part of the parabola, the spring elastic force for the whole spring steel sheet would be smooth, balanced and rated pressure value owning to the gradual change curvature, and automatically adjustable gradual change curvature is consistent with radians of various glass curved surface.

One piece of the said spring steel sheet is placed on the rubber strip which features 1st groove and 2nd groove longitudinally at both ends; two spacers are mounted into the 1st groove, and barbs of several clips are threaded through square holes, and fitted into the 2nd groove to assemble the spring steel sheet, rubber strip and spacers together.

The said end ferrule has inwardly kinked grooves at its lower part to fit into both ends of the spring steel sheet; the grooves have sticking points at its external end, which fits into the gaps at the both sides of both ends of the spring steel sheet; the end ferrule has downwardly extended higher side at its external end.

The said pivot socket has two walls, between which inner groove is formed, and has column; the pivot socket has a slot and slot points at its lower part, and the slot fits into the both sides of middle part of the spring steel sheet; the spring steel sheet has a slot at its middle part to fit into the slot point at the lower part of the pivot socket.

The said pivot socket can be removably connected to the 1st connecting adaptor, wherein a groove with downward opening is provided at its lower part to match the column of the pivot socket; a square hole is provided at the back end within a notch which is formed within the 1st connecting adaptor, and a round hole is provided at the upper wall of the square hole to match the flat-type wiper arm; a gap is provided nearly at the upper part of the 1st connecting adaptor, and a standoff is provided at a connecting adaptor cap which is provided at the front end pivot joint, to match the gap, and also a baffle sheet is provided at the inner side of the cap to fix the hook-type wiper arm; a slope is provided at the front of the square hole in the 1st connecting adaptor, and a wedge is provided at the front of the groove in the 1st connecting adaptor. A cover is provided over the pivot socket, which is, in turn, covered by a square hole provided at the middle of the cover, and both ends of the cover is formed into curved surface similar to that of the inside end of the end ferrule to cover the end of the inside of the end ferrule; the hook section is provided at the lower part of the cover to hook the lower part of the pivot socket and end ferrules.

The said pivot socket is removably connected with the 2nd connecting adaptor thereof, which is a hollow body with the lower part open; a groove with downward opening is provided at the inside of the connecting adaptor to match the column of the pivot socket, and round holes are provided at the side wall of the connecting adaptor, and a resilient sheet is provided above the round hole within the connecting adaptor; a hole is provided at the supporting wall of the pivot socket opposite to the round hole of the connecting adaptor; two troughs are provided at the top of the 2nd connecting adaptor to match two supporting walls of the pivot socket; a groove is provided at the top of the 2nd connecting adaptor to match the wiper arm with a hook; a concave is provided at the top of two supporting walls of the pivot socket to match the groove of the 2nd connecting adaptor. A cover is provided over the pivot socket, which is, in turn, covered by a square hole provided at the middle of the cover, and both ends of the cover is formed into curved surface similar to that of the inside end of the end ferrule to cover the end of the inside of the end ferrule; the hook section is provided at the lower part of the cover to hook the lower part of the pivot socket and end ferrules.

The said pivot socket is removably connected with the 3rd connecting adaptor thereof, which is a hollow body with the lower part open; a groove with downward opening is provided at the inside of the connecting adaptor to match the column of the pivot socket, and a resilient boss is provided at the top wall of the connecting adaptor to match the hole in the wiper arm; two troughs are provided at the top of the 3rd connecting adaptor to match the two supporting walls of the pivot socket. A cover is provided over the pivot socket, which is, in turn, covered by a square hole provided at the middle of the cover, and both ends of the cover is formed into curved surface similar to that of the inside end of the end ferrule to cover the end of the inside of the end ferrule; the hook section is provided at the lower part of the cover to hook the lower part of the pivot socket and end ferrules.

The said pivot socket is removably connected with the 4th connecting adaptor thereof, which is a hollow body with the lower part open; a groove with downward opening is provided at the inside of the connecting adaptor to match the column of the pivot socket; a slot is provided at the front of the top wall of the 4th connecting adaptor to match the block at the front of the wiper arm, and the front of the slot serves as blocking wall to match the front-end surface of the wiper arm; resilient clamp stands are provided at the both sides of the 4th connecting adaptor to match the clamping surface of the wiper arm; two troughs are provided at the top of the 4th connecting adaptor to match the two supporting walls of the pivot socket. A cover is provided over the pivot socket, which is, in turn, covered by a square hole provided at the middle of the cover, and both ends of the cover is formed into curved surface similar to that of the inside end of the end ferrule to cover the end of the inside of the end ferrule; the hook section is provided at the lower part of the cover to hook the lower part of the pivot socket and end ferrules.

The said pivot socket is removably connected with the 5th connecting adaptor thereof, which is a hollow body with the lower part open; a groove with downward opening is provided at the inside of the connecting adaptor to match the column of the pivot socket; a slot is provided at the front of the top wall of the 5th connecting adaptor to match the block at the front of the wiper arm, and the front of the slot serves as blocking wall to match the front-end surface of the wiper arm; resilient clamp stands are provided at the both sides of the 5th connecting adaptor to match the clamping surface of the wiper arm; resilient clamp stands are provided at the top wall of the connecting adaptor to match the clamping hole at the top of the wiper arm; two troughs are provided at the top of the connecting adaptor to match the two supporting walls of the pivot socket. A cover is provided over the pivot socket, which is, in turn, covered by a square hole provided at the middle of the cover, and both ends of the cover is formed into curved surface similar to that of the inside end of the end ferrule to cover the end of the inside of the end ferrule; the hook section is provided at the lower part of the cover to hook the lower part of the pivot socket and end ferrules.

The said pivot socket is removably connected with the 6th connecting adaptor thereof, which is a block body, and a groove with downward opening is provided within the connecting adaptor to match the column of the pivot socket, and slot is formed at the back side of the groove to connect the latter; the slot is to match the clamp block at the front of the wiper arm, and boss is formed at the front of the slot to match the front-end clamp block of the wiper arm; a resilient clamp stands are provided at both sides of the 6th connecting adaptor to match the clamping surface of the wiper arm; additionally, two side surfaces of the foresaid 6th connecting adaptor forms into stepped surfaces, viz, the bigger lower stepped surface matching the internal notch of the pivot socket, and the smaller upper stepped surface matching U-shape wiper arm; also the blocking wall is formed at the front of the 6th connecting adaptor to match the front-end surface of the wiper arm. A cover is provided over the pivot socket, which is, in turn, covered by a square hole provided at the middle of the cover, and both ends of the cover is formed into curved surface similar to that of the inside end of the end ferrule to cover the end of the inside of the end ferrule; the hook section is provided at the lower part of the cover to hook the lower part of the pivot socket and end ferrules.

With the above-mentioned solutions taken, this invention will at least bring about following benefits:

1. As the crest section and curved surface of the said end ferrule is specifically designed to become outwardly lower and higher respectively, and couple with externally curved surface with special structure, it leaves wind resistance to be concentrated on the middle portion of the wiper blade structure, and higher outside end of curved surface is also helpful to stop air current from flowing out of the outside end of the end ferrule. In this way, it makes air current hard to flow out of both ends of the wiper blade but to be gathered within the internal end of curved surface, assisting in pressing down the wiper blade, and facilitating close contact between the rubber strip and glass, which as a result, avoids wiper lift off from the windshield glass owning to wind resistance against the windshield at highway speeds.

2. Inward concave curvature for curved surface of the said end ferrule enables wind resistance to offset blowing wind force, resulting in effect of balanced wiping.

3. The said spring steel sheet is of symmetrical parabola. As parabola curvature is gradually changed, and there is no joint generated by arch section, when the spring steel sheet is pressed flat at its middle portion, pressing force will be generated on the whole spring steel sheet, resulting in better performance of the wiper blade. After the parabola is pressed flat by applying force to its middle portion, smooth and balanced pressing force is generated on the whole spring steel sheet, enabling the spring steel sheet curvature to be automatically adjusted for consistency with curvature for a variety of glass curved surface, and better performance of wiping. Additionally, rating pressing force can be generated by restricting curvature ratio of height to width of the parabola, and make pressed rubber strip gain the rating pressing value, which, in turn, delivers good performance of wiping.

4. The connecting structures between the pivot socket and spring steel sheet, and pivot socket and a variety of connecting adaptors can be removably connected without being welded or riveted, which not only facilitates use, but also avoid waste in that only damaged parts need replacing.

5. This invention needs only one pivot socket structure, which facilitates assembly with multiple connecting adaptor structures for compatibility with multiple wiper arm models or structures. For users, it is possible to normalize products only by selecting a corresponding connecting adaptor to facilitate compatibility of one wiper blaze structure with multiple models or types of wiper arms.

6. Actually, the sticking point within the groove outside the said end ferrule and high edge at the outside end, which corresponds to the end buckle of existing products, enable to simplify structure as well as fix the both ends of the spring steel sheet without welding or riveting them in a bid to prevent the rubber strip and spacers for the rubber strip from falling off. As a result, it is convenient to assemble, remove and replace. The curved surface outside of the end ferrule also plays roles to enhance the appearance.

7. The curved surface set for both ends of the cover for the said pivot socket, which is same with that of the end ferrule, can cover inner end face of the end ferrule, enabling to protect the end ferrule as well as to prevent impurity from entering into the end ferrule.

BRIEF DESCRIPTION OF THE DRAWINGS

FIG. 1 is a perspective view of one typically existing boneless wiper blaze;

FIG. 2 is a sectional view of the end ferrule part in FIG. 1;

FIG. 7 is a perspective view of the said end ferrule hereof;

FIG. 7A is a sectional view A-A of FIG. 7;

FIG. 7B is a sectional view B-B of FIG. 7;

FIG. 7C is a sectional view C-C of FIG. 7;

FIG. 7D is a sectional view D-D of FIG. 7;

FIG. 7E is a sectional view E-E of FIG. 7;

FIG. 22A is a sectional view A-A of FIG. 22;

DESCRIPTION OF THE PREFERRED EMBODIMENT

In the following, the present invention will be further amplified by means of drawings and specific embodiment.

Figure 3A:
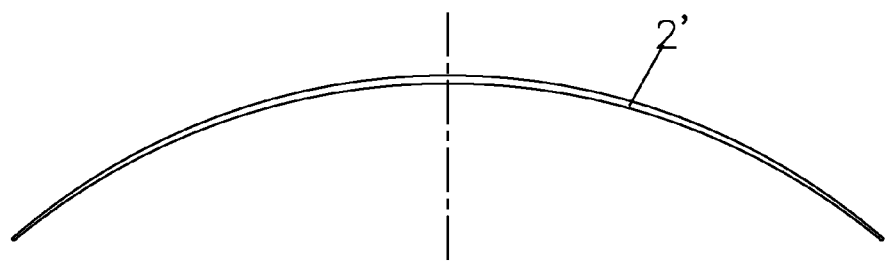
FIG. 3A is a side view of one spring steel sheet structure of one boneless wiper blaze.
Figure 3B:
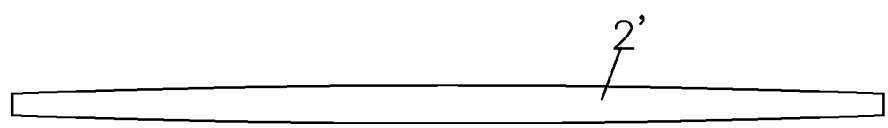
FIG. 3B is a top view of FIG. 3A.
Figure 3C:
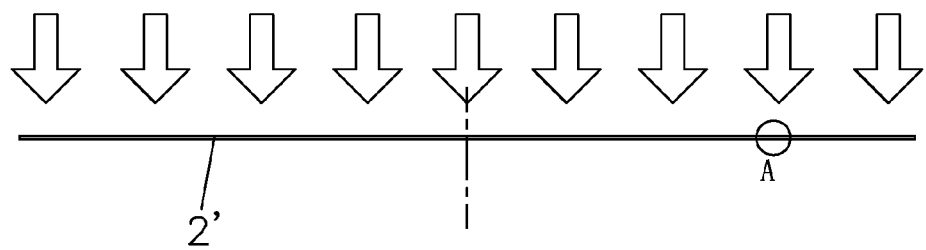
FIG. 3C is a schematic drawing showing another flatten spring steel sheet structure of one boneless wiper blaze.
Figure 3D:
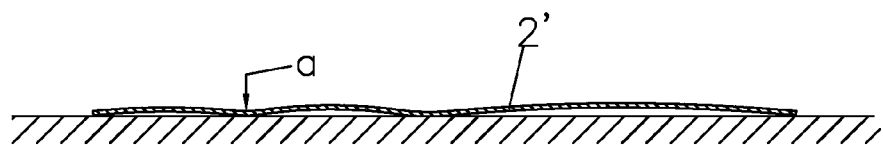
FIG. 3D is a schematic drawing showing Micro magnified position A in FIG. 3C.
Figure 4:
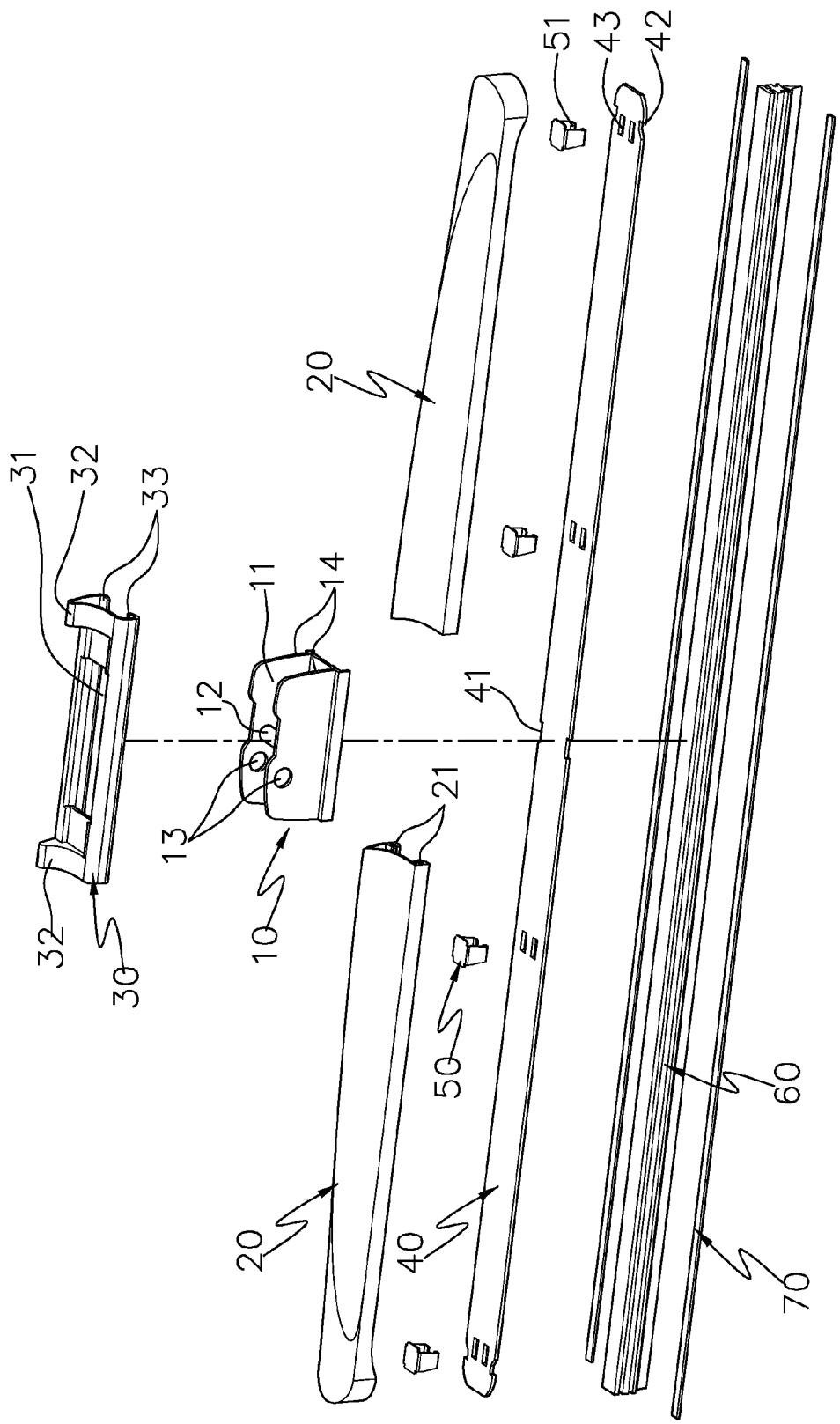
FIG. 4 is a perspective exploded view of this invention without being provided with the connecting adaptors.
Figure 5:
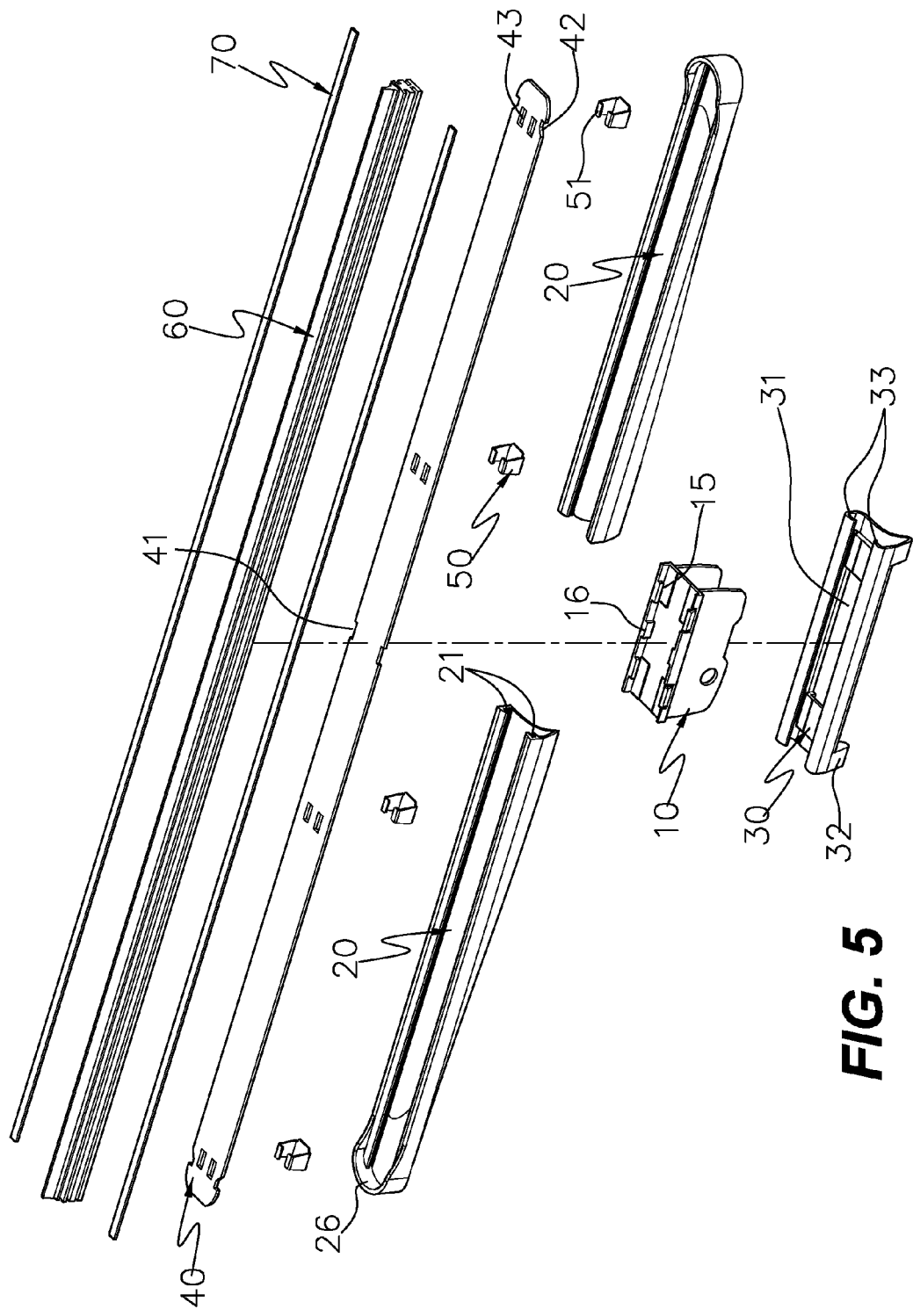
FIG. 5 is a perspective bottom-to-top exploded view of this invention without being provided with the connecting adaptors.
Figure 6:
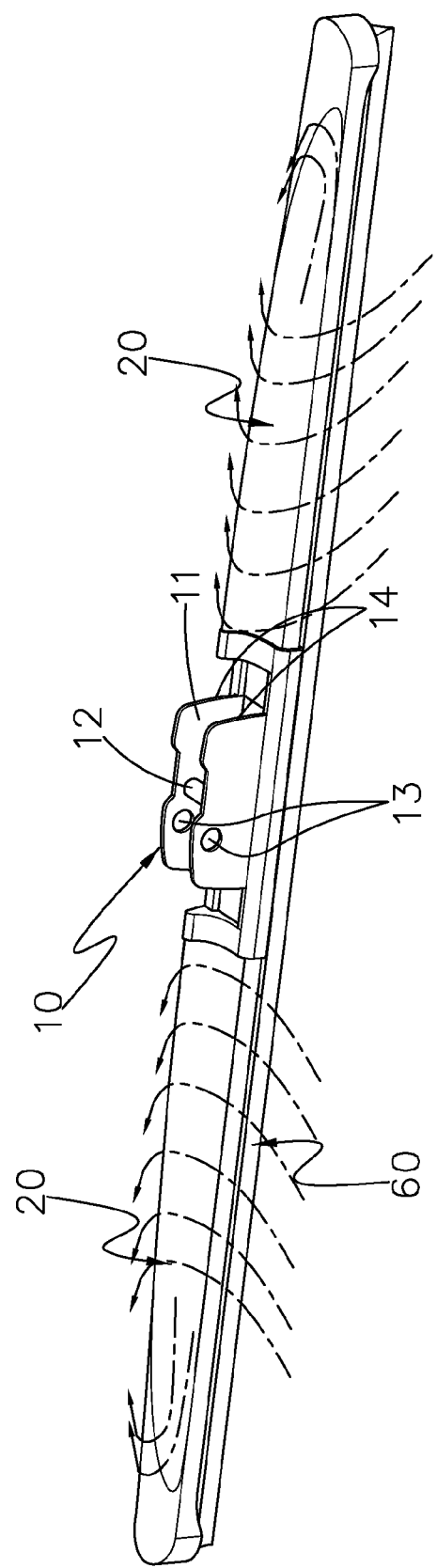
FIG. 6 is a perspective combination view of this invention without being provided with the connecting adaptors.

The present invention discloses a boneless wiper blade (as shown in FIGS. 4, 5 and 6), which is one preferred embodiment of the present invention. The said wiper blade consists of a pivot socket 10, two end ferrules 20, a pivot socket cover 30, a piece of spring steel sheet 40, several clutches 50, a rubber strip 60 and two spacers 70, along with a connecting device mounted on the pivot socket 10 (provided blow for details), wherein:

The said pivot socket 10 is provided with two support walls 14; inner notch 11 is formed between two support walls 14; inner notch 11 is provided with a column 12; a hole 13 is provided at the support wall 14; a concave 17 is provided at the top, and a slot 15 and slot point 16 are provide at the lower part of the pivot socket 1.

As shown in FIG. 7, and FIG. 7A-7E, a inwardly kinked groove 21 is provided at the said end ferrule 20 to firmly match both sides of the undermentioned spring steel sheet 40; the end ferrule 20 features a upward elevated and eccentrically-set crest section 22 at its upper part, and the longer side of the crest section forms a inwardly curved surface 23; vertically, the said crest section 22 becomes lower outwardly, and the curved surface 23 becomes higher exteriorly, resulting in integrating the crest section 22 and inwardly-curved surface 23 as a smooth curve;

Externally curved surface 24, whose cross section is upwardly convex arc-shaped, which vertically becomes higher inwardly, and finally integrates with the crest section 22 and the curved surface 23, is provided at the outer end of the said end ferrules 20.

Figure 8:
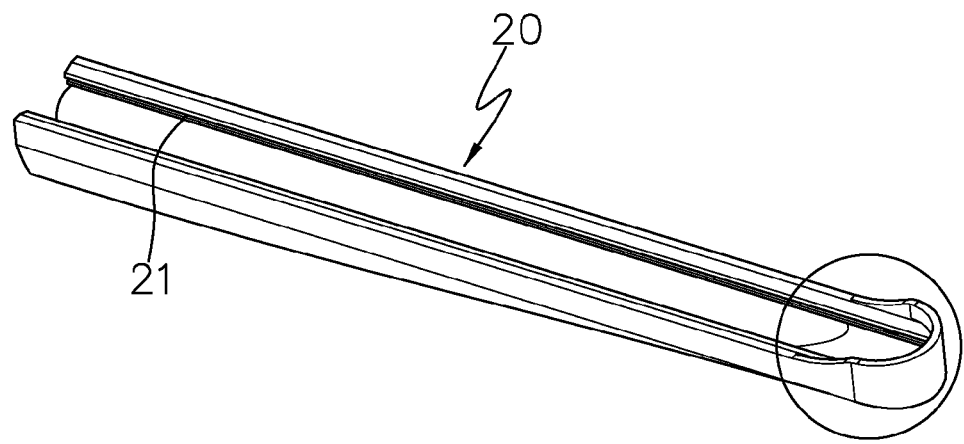
FIG. 8 is a perspective view of the said end ferrule of the present invention as seen from underneath.
Figure 8A:
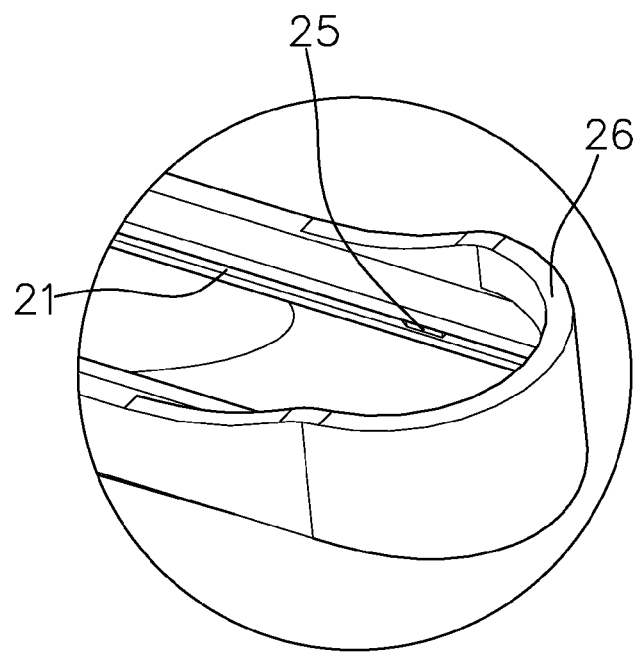
FIG. 8A is a partial enlargement view of FIG. 8.

As shown in FIG. 8 and FIG. 8A, the grooves 21 of the end ferrule 20 have sticking points 25 at its external end to facilitate connection of the said end ferrule 20 with the spring steel sheet 40; the end ferrule 20 has downwardly extended higher side 26 at its external end.

Inward concave curvature for curved surface 23 of the said end ferrule 20 enables wind resistance to offset blowing wind force, resulting in effect of balanced wiping. As the crest section 22 and curved surface 23 of the said end ferrule is specifically designed to become outwardly lower and higher respectively, and couple with externally curved surface 24 with special structure, it leaves wind resistance to be concentrated on the middle portion of the wiper blade structure, as indicated by the arrow in FIG. 6, higher outside end of curved surface 23 is also helpful to stop air current from flowing out of the outside end of the end ferrule 20. In this way, it makes air current hard to flow out of both ends of the wiper blade but to be gathered within the internal end of curved surface 23, assisting in pressing down the wiper blade, and facilitating close contact between the rubber strip and glass, which as a result, avoids wiper lift off from the windshield glass owning to wind resistance against the windshield at highway speeds.

The said pivot socket cover 30 is provided with a square hole 31 at its middle, its both ends form into a curved surface 32 with same shape with the inner end of the end ferrule 20, and a hook section 33 is provided at its lower part.

Figure 9A:
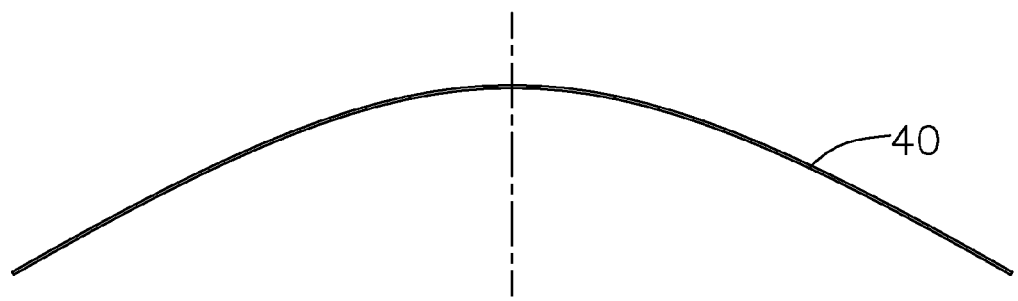
FIG. 9A is a schematic drawing showing the natural state of the spring steel sheet of the present invention.

As shown in FIG. 9A, the said spring steel sheet 40, a resilient strip, is in parabolic shape under free state. The spring steel sheet 40 is provided with a slot 41 at its both sides to match the slot point at the lower part of the pivot socket 10; the both sides of both ends of the sheet is provided with gap 42 to match the slot point 25 at lower part of the end ferrule 20; the spring steel sheet 40 is provided with several square holes 43 at its steel surface.

Figure 9B:
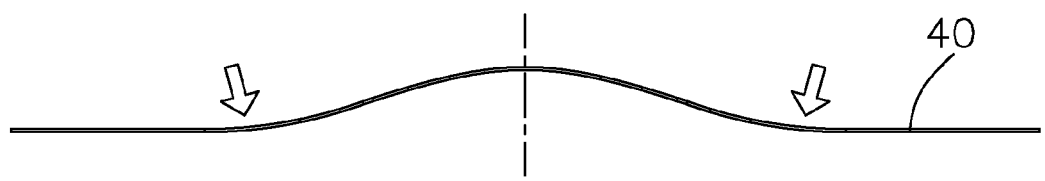
FIG. 9B is a schematic drawing showing the state of the spring steel sheet of the present invention at its midpoint under press.
Figure 9C:
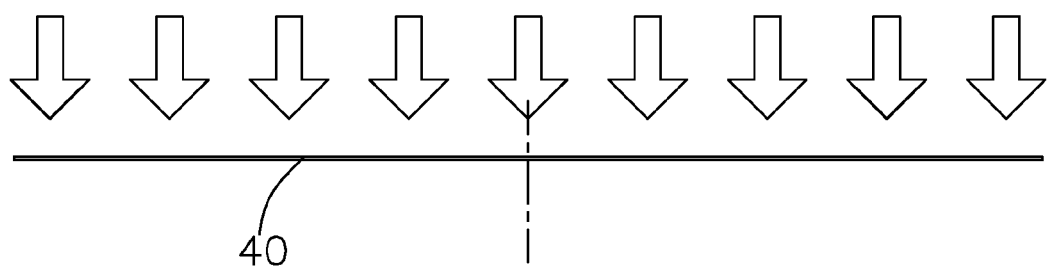
FIG. 9C is a schematic drawing showing the state of the spring steel sheet of the present invention in use.

Balanced pressing force can be generated as the spring steel sheet 40 of the present invention is designed to be in symmetrical parabolic curve shape (as shown in FIG. 9A). The reason is that curvature of the parabolic curve is gradually changed, and there is no arch section joint; with rating elastic force for springs resulting from restricting height and curvature ratio of chord width of parabola, and by flatting the parabola (as shown in FIG. 9C) by applying pressure to the middle part of the parabola (as shown in FIG. 9B), the spring elastic force for the whole spring steel sheet would be smooth, balanced and rated pressure value owning to the gradual change curvature, and automatically adjustable gradual change curvature is consistent with radians of various glass curved surface, realizing better effect of wiping.

Figure 10:
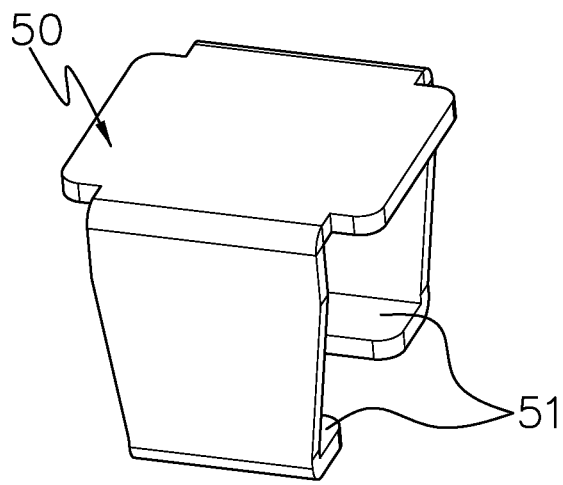
FIG. 10 is a perspective view of the clutch of the present invention.

The said clutch 50 (as shown in FIG. 10) is provided with a barb 51 at its lower part.

Figure 11:
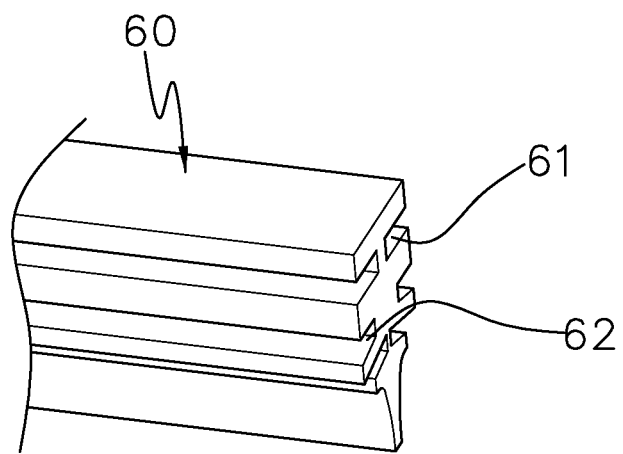
FIG. 11 is a partial perspective view of the rubber strip of the present invention.

The said rubber strip 60 is a long strip body, with 1st groove 61 and 2nd groove 62 provided at its both vertical sides (as shown in FIG. 11).

The said spacer 70 is mounted in the 1st groove 61 of the rubber strip 60. Assembly of this invention may take steps as follows, Firstly, two spacers 70 is mounted in the 1st groove 61 at both sides of the rubber strip 60, and the spring steel sheet 40 is placed on the rubber strip 60, and barb 51 of the clutch 50 is threaded through the square hole 43 on the spring steel sheet 40, and then the barb 51 is firmly matched with the 2nd groove. In this way, spring steel sheet 40, clutch 50, rubber strip 60 and spacer 70 are so integrated that the rubber strip 60 and spacer 70 would not fall off.

Secondly, groove 15 of the pivot socket 10 is matched with both sides of the middle portion of the spring steel sheet 40, and the slot point 16 is aligned with the slot 41 at the middle of the spring steel sheet 40. In this way, the pivot socket 10 is removably connected at the middle of the spring steel sheet 40. As there is no need for riveting or welding in the structure, it is convenient to remove or replace damaged parts.

Thirdly, two end ferrules 20 are mounted at both ends of the pivot socket 10 respectively by matching groove 21 with the both sides of the spring steel sheet 40, and gap 42 at both ends of the spring steel sheet with slot point 24 of the end ferrule 20 so as to prevent the end ferrule from falling off. The high edge 26 outside of the end ferrule 20 can cover exterior ends of the spring steel sheet 40 and the rubber strip 60, providing protection for the spring steel sheet 40 and rubber strip 60. The exterior-end slot point 25 and high edge 26 of the end ferrule 20 play roles corresponding with end buckle of existing products. Unlike end buckle, which is fixed by means of welding or riveting, they are aligned and matched together, so it is convenient to assemble and disassemble.

Fourthly, the pivot socket 10 is fit into the square hole 31 of the pivot socket cover 30, and inner end of the end ferrule 20 is covered by curved surface at both ends of the pivot socket cover 30. The pivot socket 10, and end ferrule 20 are hooked by the hook section 33 at the lower part of the pivot socket cover 30 at the latter's lower part. In this way, the pivot socket 10, end ferrule 20 and pivot socket cover 30 are integrated. Coverage of cover inner end of the end ferrule 20 by the pivot socket cover can not only protect end ferrule 20, but also prevent impurity from entering into the end ferrule 20.

Figure 12:
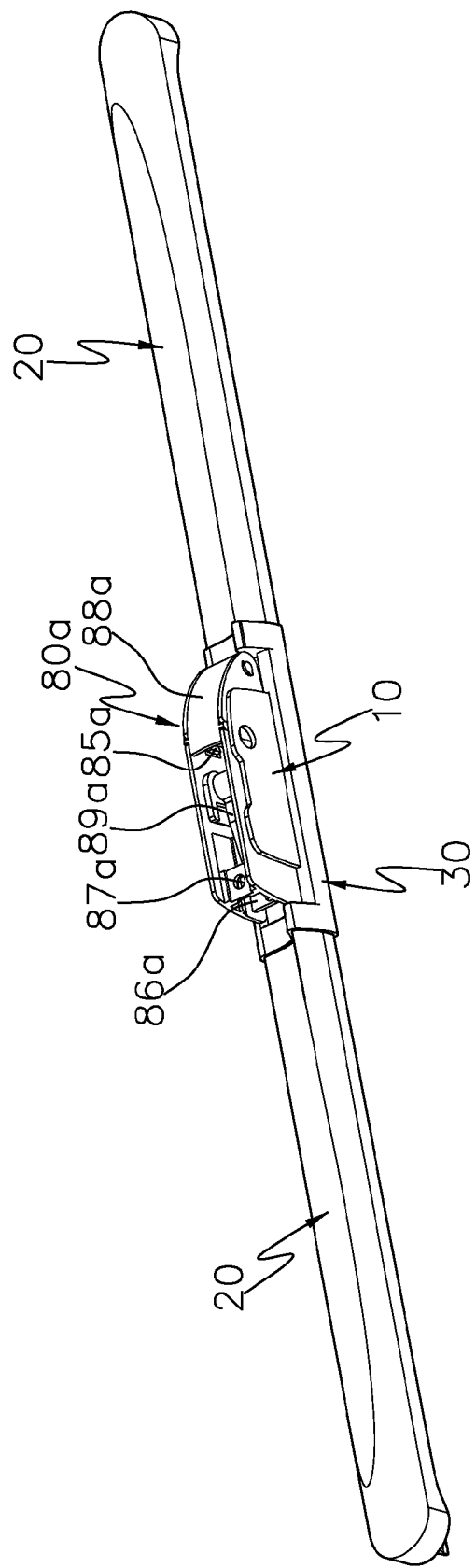
FIG. 12 is a perspective view showing combination of the 1st connecting adaptor and other parts of the wiper blade of the present invention.

Benefit of the above-mentioned wiper blade structure lies in that the pivot socket 10 can be mounted with multiple connecting adaptor structures for compatibility with various wiper arms. This invention relates to several connecting adaptor structures, which are to be described in the following. The 1st connecting adaptor 80a of the present invention is shown in FIG. 12-14.

Figure 13:
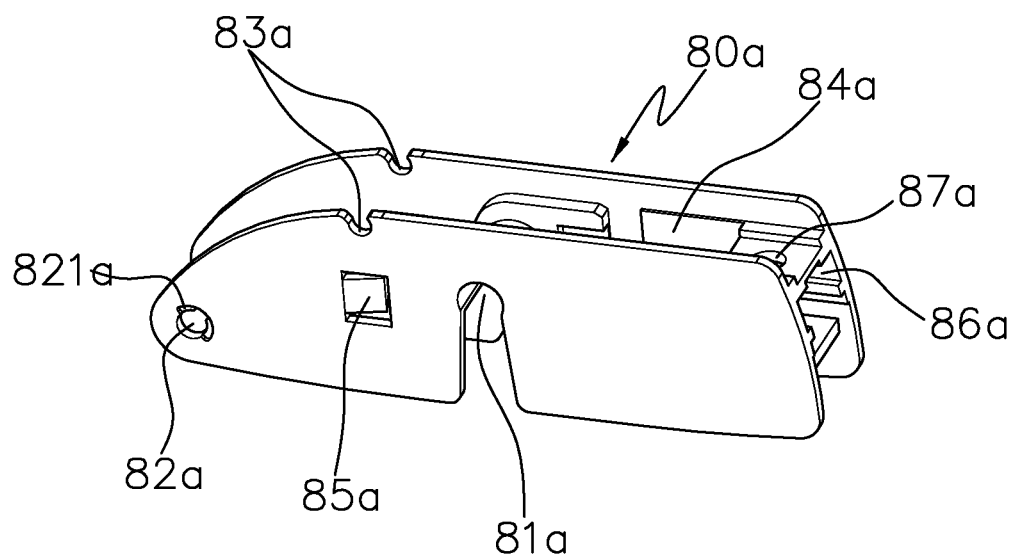
FIG. 13 is a perspective schematic drawing showing the 1st connecting adaptor of the present invention.
Figure 14:
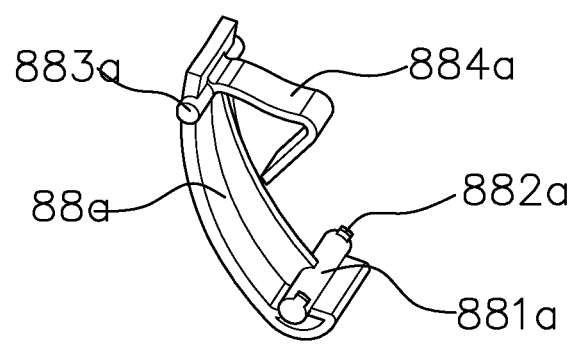
FIG. 14 is a perspective schematic drawing showing the cover for the 1st connecting adaptor of the present invention.

Notch 84a is formed into the said 1st connecting adaptor 80a (as shown in FIG. 13). A slot 81a with downward opening is provided at the lower part of the 1st connecting adaptor 80a, and a hole 82a is provided at the front end of the adaptor. Limit arc notch 821a is provided at the edge of the hole 82a. A gap 83a is provided at the front of the upper part of the 1st connecting adaptor, and a wedge 85a is provided at the front of the slot 81a; a square hole 86a is provided at the back end within the groove 84a; a circular hole 87a is provided at the upper wall of the square hole 86a; and a slope 89a (as shown in Nomograph 12 or FIGS. 16 and 18) is also provided at the front of the square hole 86a. Additionally, a connecting adaptor cover 88a (as shown in FIG. 14), which is provided with a jack post 881a, bump 882a, clamp column 883a and block piece 884*a*, is pin jointed with the front end of the 1st connecting adaptor 80*a*. The said jack post 881*a* is pin-jointed with the hole 82*a* on the 1st connecting adaptor 80*a*; the bumps 882*a* are provided at the both ends of the jack post 881*a*, and match up with the above-mentioned limit arc notch 821*a* to limit place of rotation of the connecting adaptor cover 88*a*; the said clamp column 883*a* can be locked in the gap 83*a* on the 1st connecting adaptor 80*a* with a view to cover the front end of the 1st connecting adaptor with the connecting adaptor cover 88*a*; the said block piece 884*a* is provided at the inner side of the connecting adaptor cover 88*a*, and can be elastic enough to fix the aftermentioned hook-type wiper arm 9A.

When the said 1st connecting adaptor 80*a* is assembled with the pivot socket 10, it is fit into the inner groove 11 of the pivot socket 10, and is fixed by locking the column 12 of the pivot socket 10 into its slot 81*a*. The said 1st connecting adaptor 80*a* may be firmly assembled with the hook-type wiper arm and flat-type wiper arm.

Figure 15:
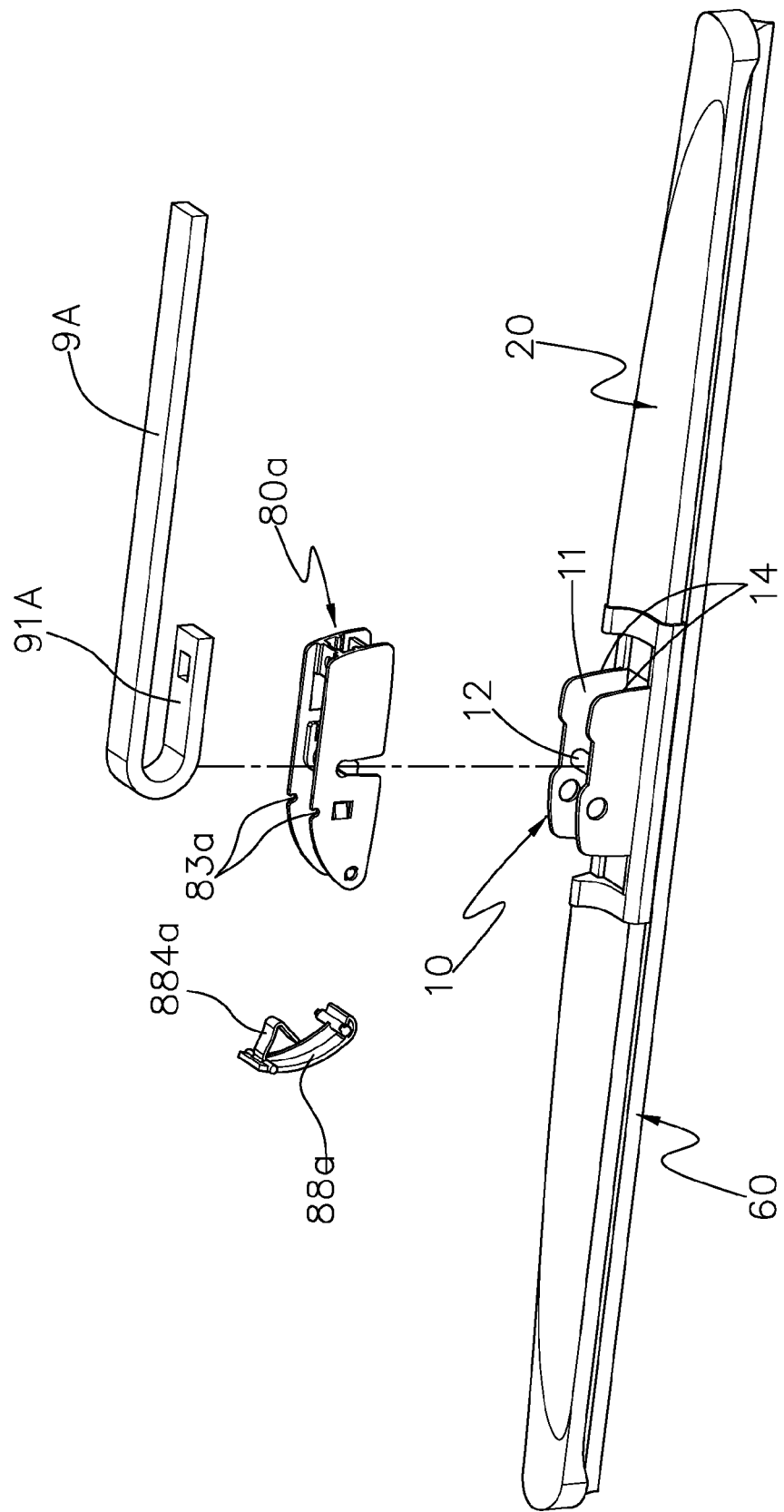
FIG. 15 is a perspective exploded view showing connection of the 1st connecting adaptor with other parts of the wiper blade and hook-type wiper arm of the present invention.
Figure 16:
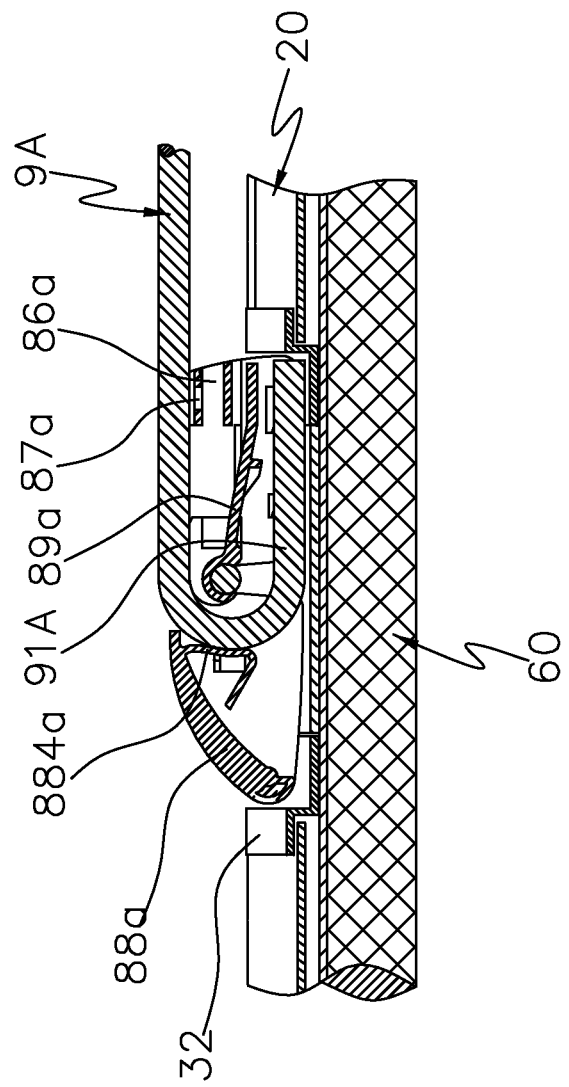
FIG. 16 is a combination sectional view of FIG. 15 of the present invention.

FIGS. 15 and 16 are schematic drawings showing assembly of the above-mentioned 1st connecting adaptor of the present invention with the hook-type wiper arm 9A. The said hook-type wiper arm 9A is an existing structure, with its front end being formed into a hook 91A.

When the said 1st connecting adaptor 80*a* is assembled with the wiper arm 9A, firstly, turn up the cover 88*a* for the 1st connecting adaptor 80*a*, and then mount the hook at the front of the wiper arm 9A in the slot 84*a* of the 1st connecting adaptor, and then turn down the cover 88*a* after positioning by the wedge 85*a* so as to lock the clamp column 883*a* into the gap 83*a* on the 1st connecting adaptor 80*a*. So the block piece 884*a* will lean against the front end of the wiper arm 9A to reinforce the latter.

Figure 17:
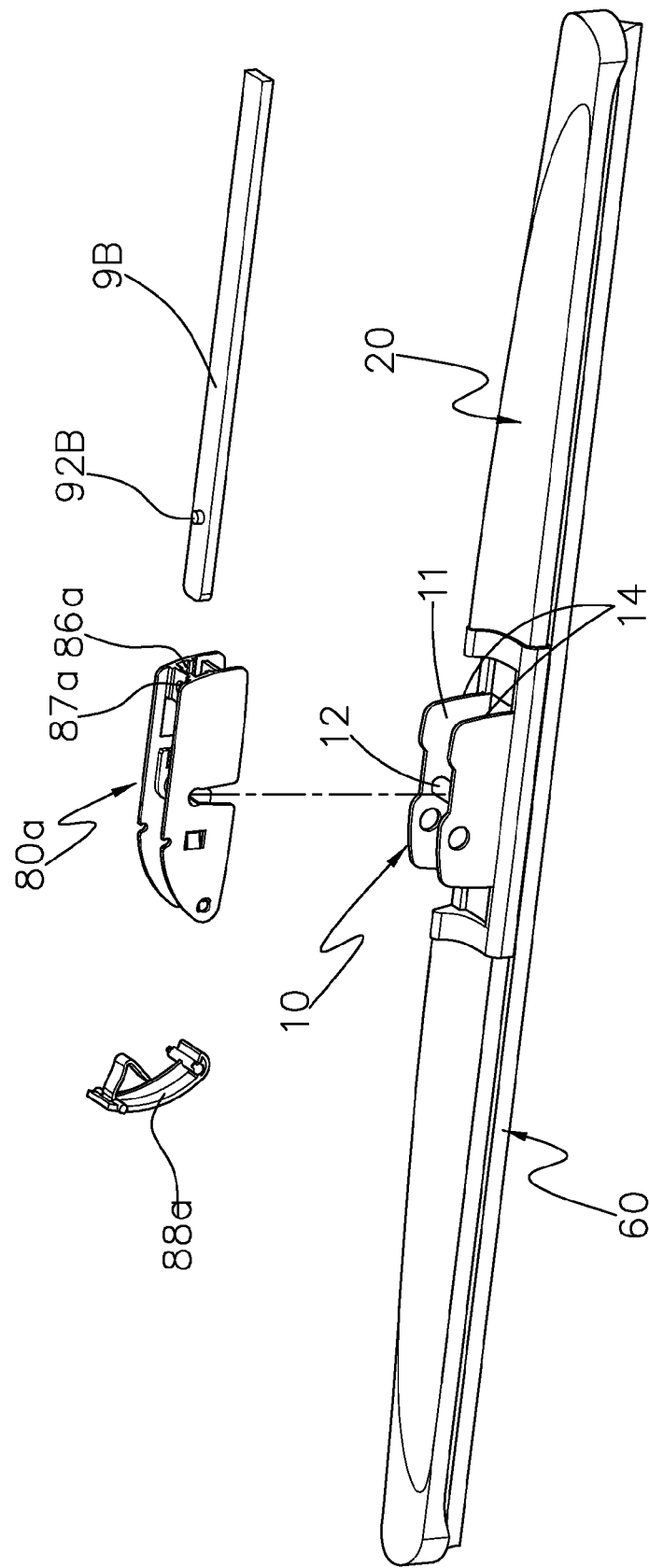
FIG. 17 is a perspective exploded view showing connection of the 1st connecting adaptor with other parts of the wiper blade and flat-type wiper arm of the present invention.
Figure 18:
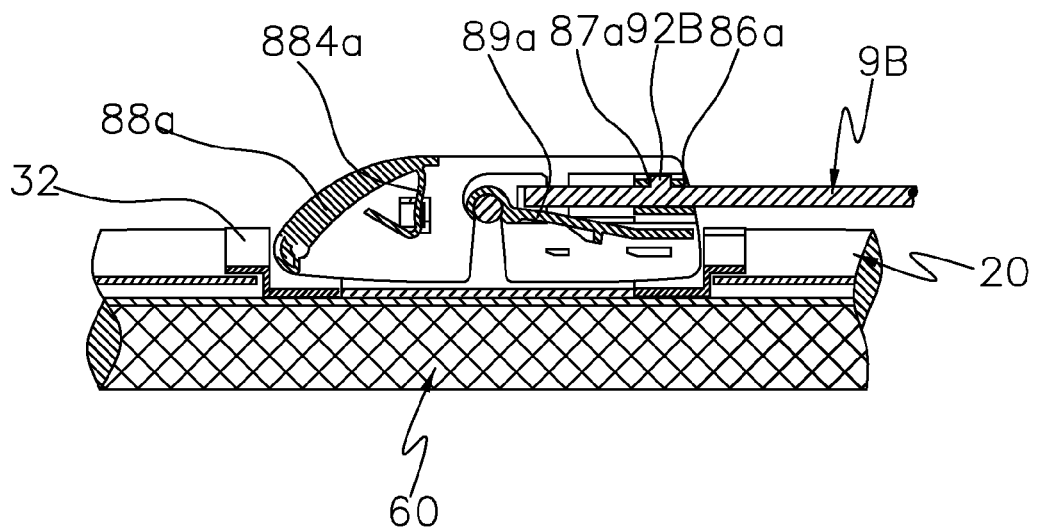
FIG. 18 is a combination sectional view of FIG. 17 of the present invention.

FIGS. 17 and 18 are structure schematic drawings showing assembly of the above-mentioned 1st connecting adaptor of the present invention with the flat-type wiper arm 9B, which is provided with a bump 92B. When the flat-type wiper arm 9B, which is also an existing structure, is assembled with the 1st connecting adaptor 80*a*, insert the wiper arm 9B into the square hole 86*a* of the 1st connecting adaptor 80*a* to lock the bump 92B into the circular hole 87*a* of the 1st connecting adaptor. Along with the circular hole 87*a*, the slope 89*a* within the slot 84*a* of the 1st connecting adaptor which reduces to slightly lift up the front end of the wiper arm 9B fix the bump 92B, making the wiper arm 9B securely connected.

Figure 19:
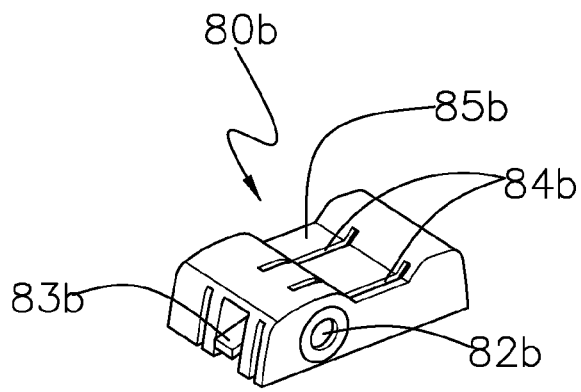
FIG. 19 is a perspective schematic drawing of the 2nd connecting adaptor of the present invention.
Figure 20:
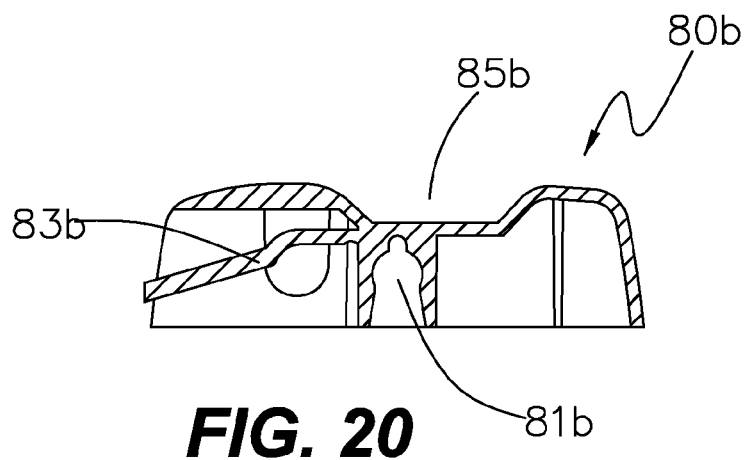
FIG. 20 is a sectional view of the 2nd connecting adaptor of the present invention.

The 2nd connecting adaptor 80*b* structure of the present invention is shown in FIGS. 19 and 20.

Figure 21:
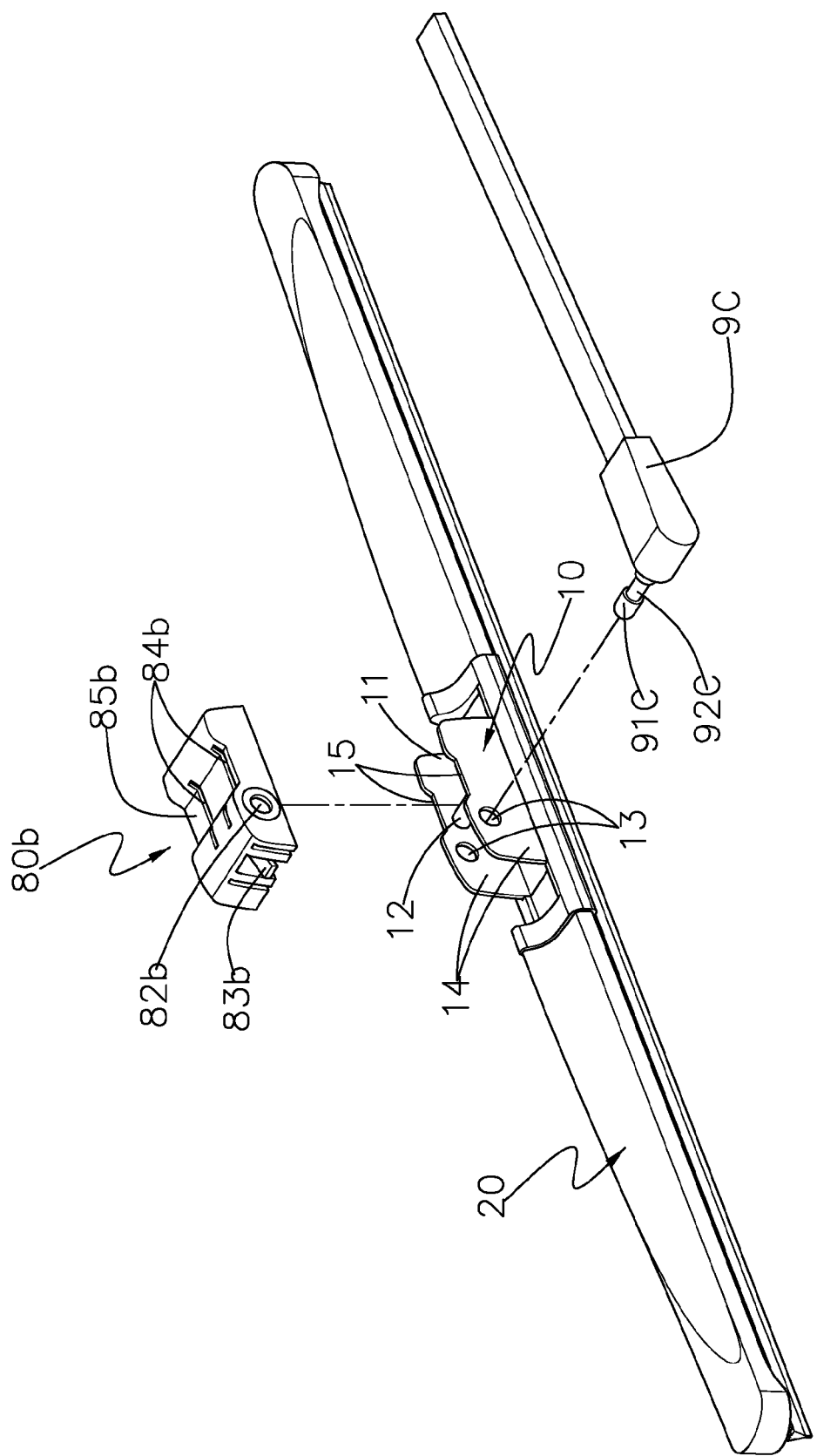
FIG. 21 is a perspective exploded view of connection of the 2nd connecting adaptor with other parts of the wiper blade and one side bolt-type wiper arm of the present invention.

The said 2nd connecting adaptor 80*b*, which is a hollow body with its lower part open, is provided with slot 81*b* with downward opening, and circular hole 82*b* on its side wall, and a resilient sheet 83*b* is provided above the round hole within the connecting adaptor, with its exterior end extending beyond the 2nd connecting adaptor 80*b*. Additionally, two troughs 84*b*, along with a groove 85*b*, is provided at the top surface of the 2nd connecting adaptor, As shown in FIG. 21, the 2nd connecting adaptor 80*b* is fit into the pivot socket, and positioned by locking the column 12 of the pivot socket 10 into its slot 81*b*, and inserting the trough 84*b* of the 2nd connecting adaptor into the support wall 14 of the pivot socket 10 when the 2nd connecting adaptor is assembled with the pivot socket 10. Following the assembly, the circular hole 82*b* on the 2nd connecting adaptor is opposite to the through-hole on the pivot socket 10. The 2nd connecting adaptor 80*b* can be compatible with existing two types of side bolt-type wiper arms.

Figure 22:
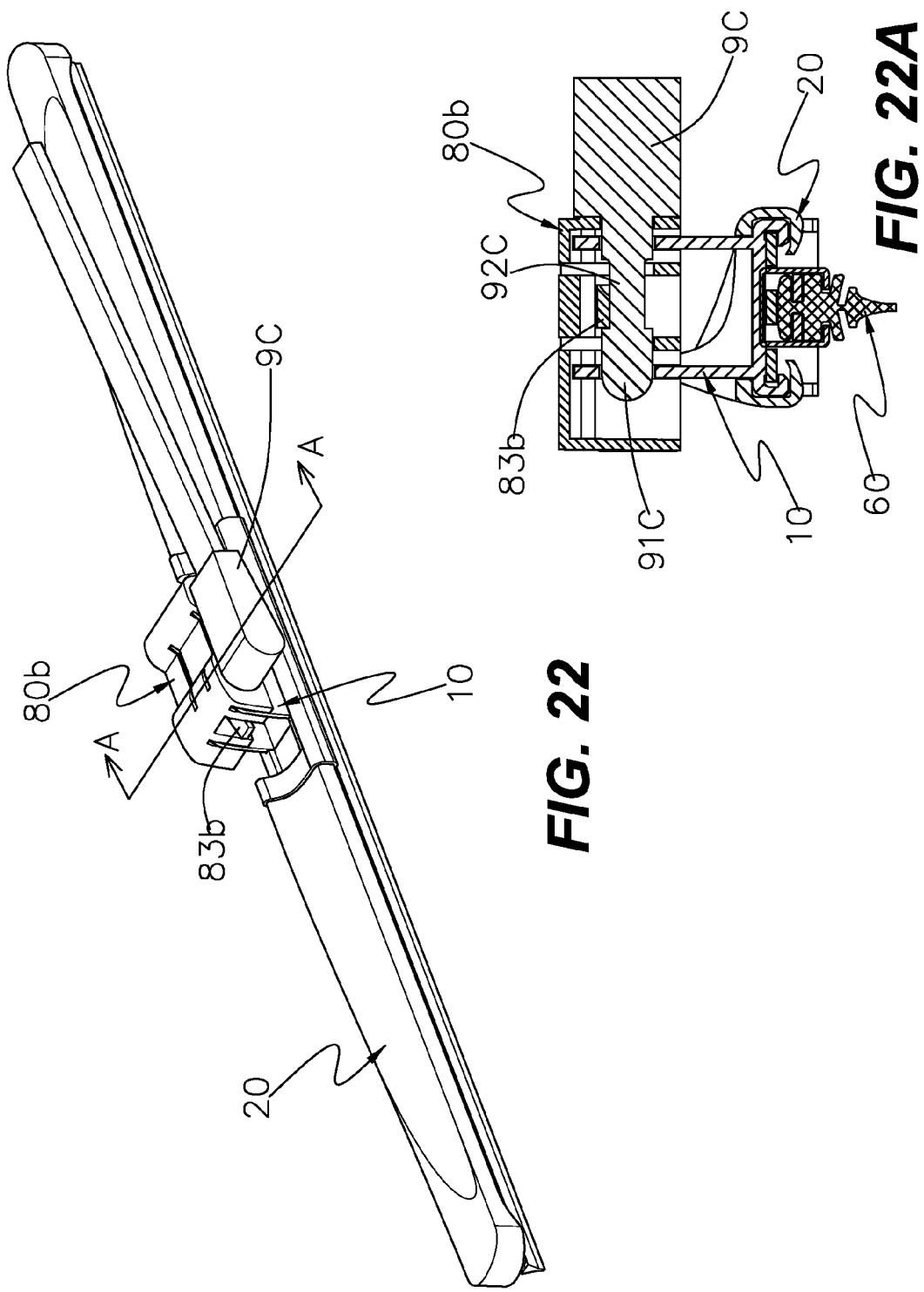
FIG. 22 is a perspective combination view of FIG. 21.
Figure 23:
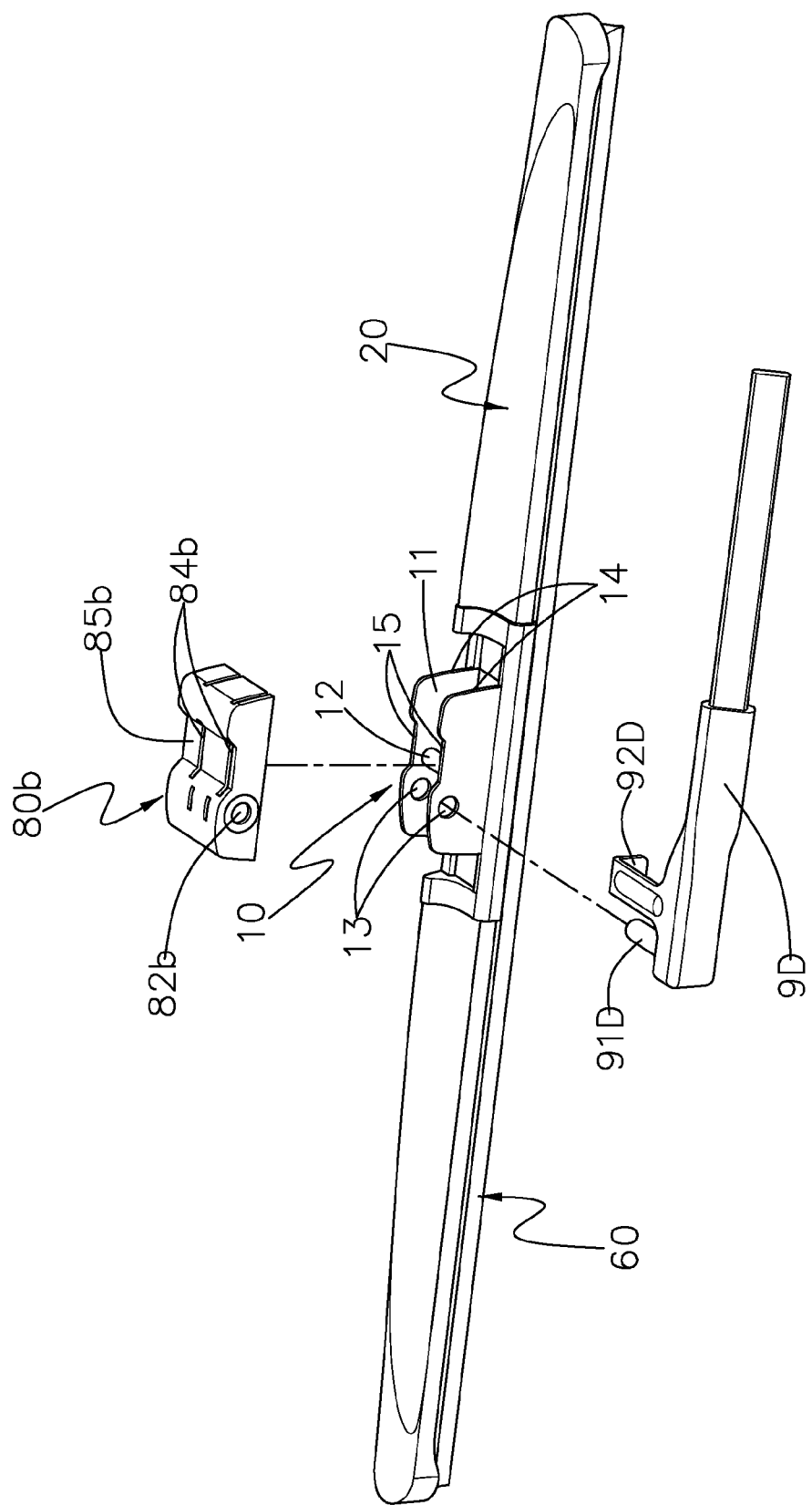
FIG. 23 is a perspective exploded view of connection of the 2nd connecting adaptor with other parts of the wiper blade and another side bolt-type wiper arm of the present invention.
Figure 24:
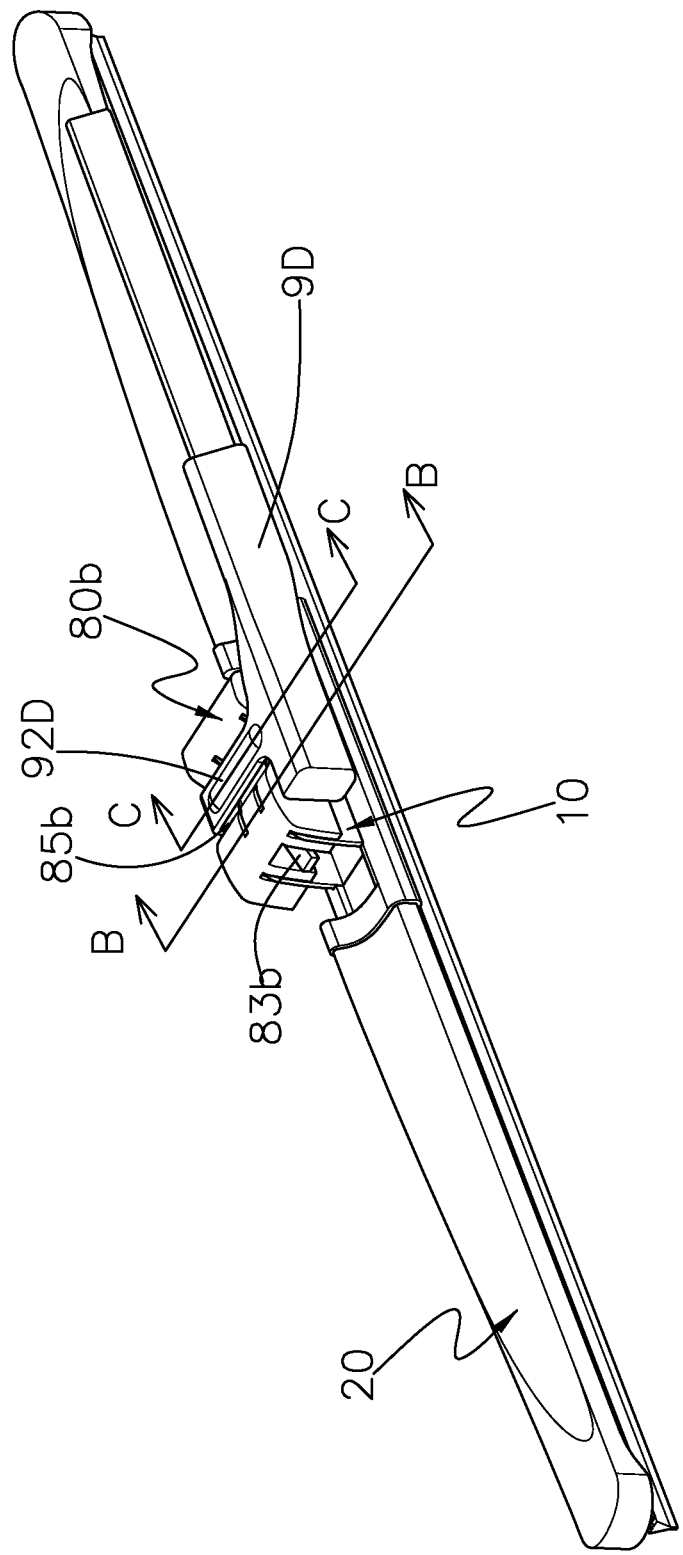
FIG. 24 is a perspective combination view of FIG. 23.
Figure 24A:
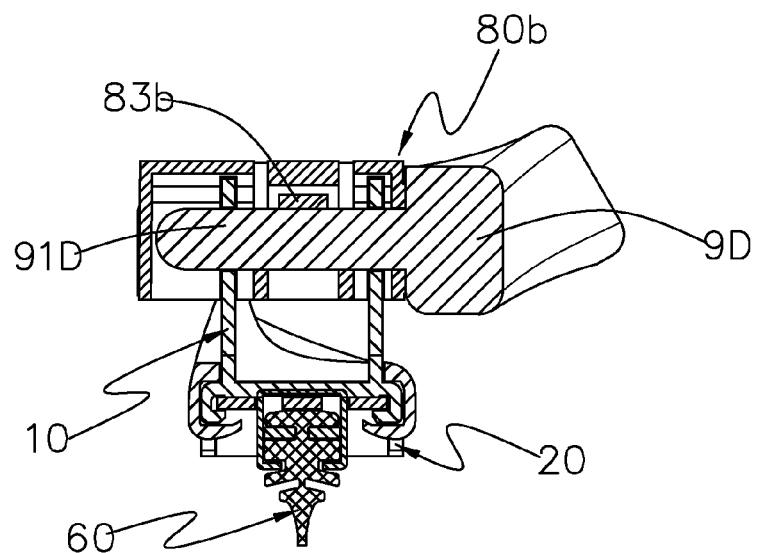
FIG. 24A is a sectional view B-B of FIG. 24.
Figure 24B:
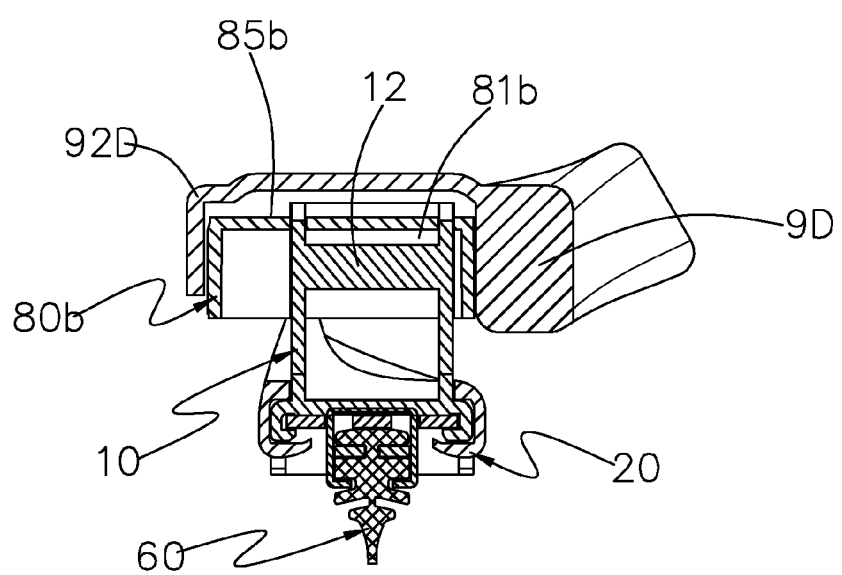
FIG. 24B is a sectional view C-C of FIG. 24.

FIGS. 21,22 and 22A is a schematic drawing showing assembly of the above-mentioned 2nd connecting adaptor 80*b* with one side bolt-type wiper arm 9C structure. Pin 91C, which is provided with inwardly recessed step 92C, is provided at the front end of the said wiper arm. When assembled, pin 91C of the wiper arm 9C is inserted into the circular hole 82*b* of the 2nd connecting adaptor 80*b*, and hole 13 of the pivot socket 10. Following it, the resilient sheet 83*b* within the 2nd connecting adaptor will be locked within the step 92C of the pin 91C, which enable the wiper arm 9C to connect with the wiper blade. When the wiper arm 9C is to be disassembled, lift the resilient sheet 83*b* of the 2nd connecting adaptor upward to disconnect it from the step 92C on the pin 91C of the wiper arm 9C. In this way, the pin 91C of the wiper arm 9C can be pulled out to separate the wiper arm 9C from the wiper blade.

FIGS. 23, 24 and FIGS. 24A and 24B are schematic drawings showing assembly of the 2nd connecting adaptor 80*b* with another side bolt-type wiper arm 9D structure. A pin 91D and hook 92D are provided at the front end of the said wiper arm 9D. When assembled, the pin 91D of the wiper arm 9D is inserted into the circular hole 82*b* of the 2nd connecting adaptor and the hole 13 on the pivot socket 10, and the resilient sheet 83*b* within the 2nd connecting adaptor will press against the pin 91D, assisting in securing the wiper arm 9D, and the hook 92D of the wiper arm 9D is used to hook the another side of the upper part of the 2nd connecting adaptor, and locked into the groove 85*b* of the 2nd connecting adaptor so as to connect the wiper arm 9D with the wiper blade. When the said wiper arm 9D is to be disassembled, rotate the wiper arm 9D around its pin 91D to lift the wiper blade upward relatively, and separate its upper hook 92D from the groove 85*b* at the top surface of the 2nd connecting adaptor. In this way, the pin 91D of the wiper arm can be pulled out to separate the wiper blade from the wiper arm 9D.

Figure 25:
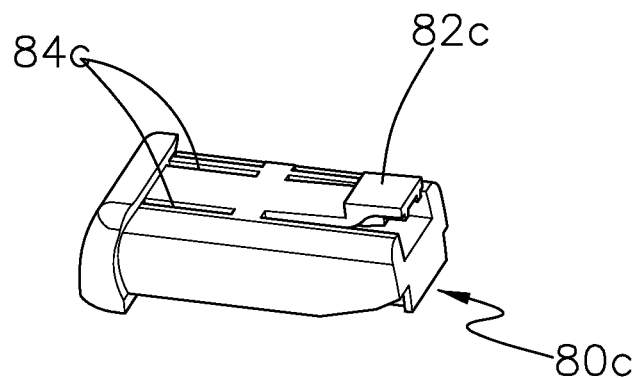
FIG. 25 is a perspective schematic drawing of the 3rd connecting adaptor of the present invention.
Figure 26:
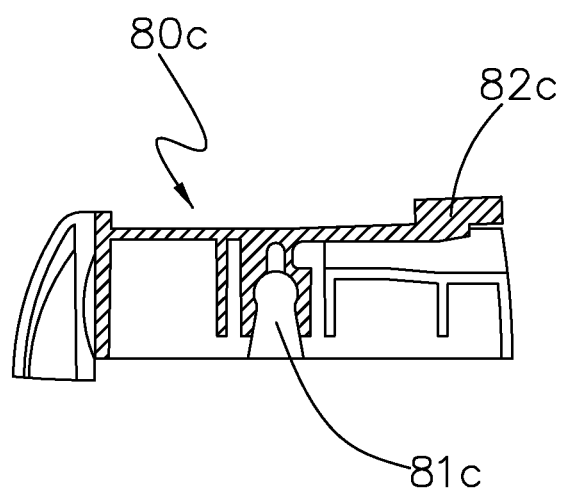
FIG. 26 is a sectional view of the 3rd connecting adaptor of the present invention.

The 3rd connecting adaptor 80*c* structure of the present invention is shown in FIGS. 25 and 26.

The said 3rd connecting adaptor 80*c* which is a hollow body with its lower part open is provided with slot 81*c* with downward opening, and with resilient boss 82*c* at its top wall. Apart from its own elastic force, the resilient boss 82*c* gains additional elastic force in traditional way where only one side of the boss is connected with the main body. Two troughs 84*c* are provided at the top surface of the 3rd connecting adaptor.

Figure 27:
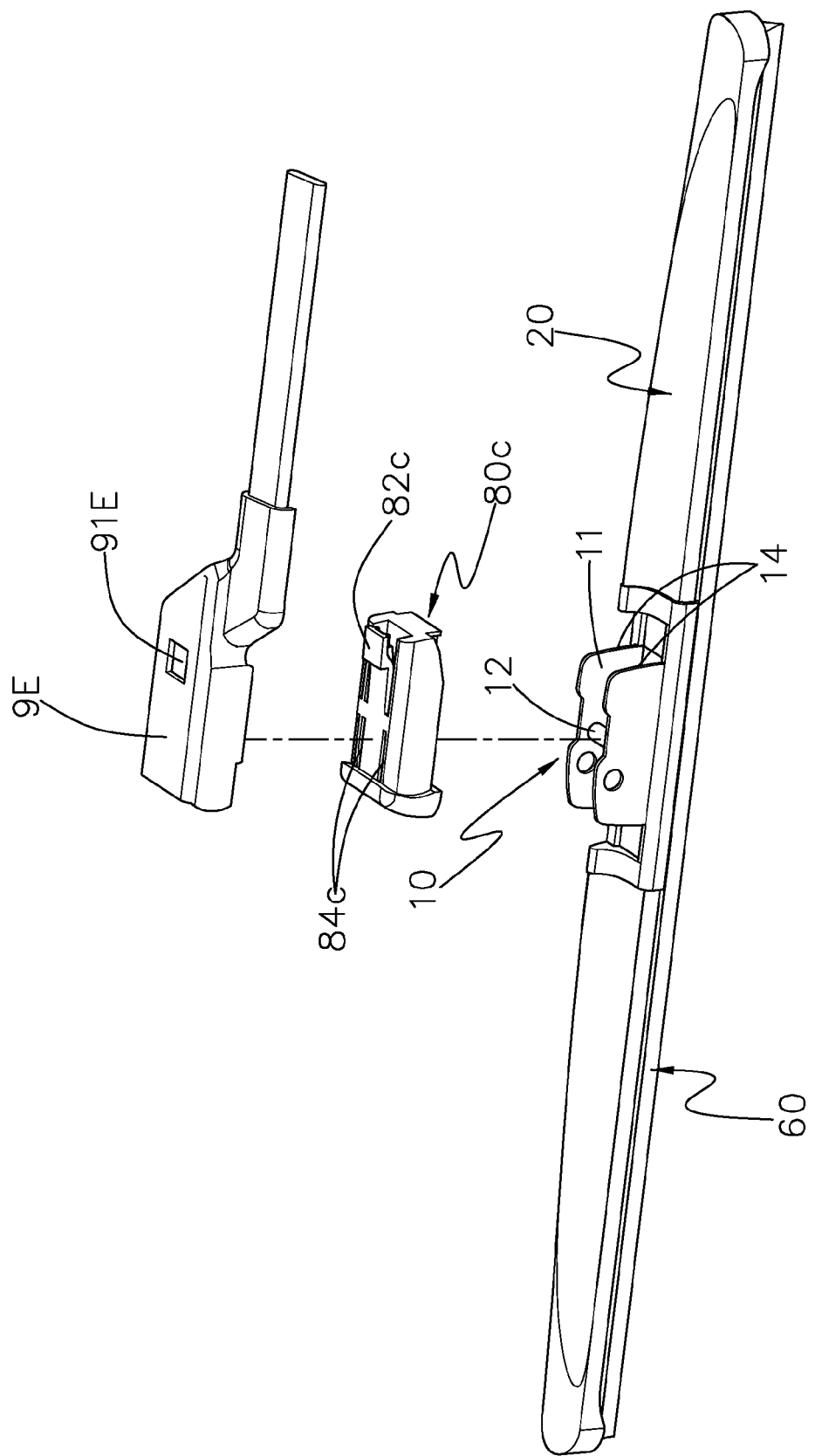
FIG. 27 is a perspective exploded view of connection of the 3rd connecting adaptor with other parts of the wiper blade and one wiper arm of the present invention.
Figure 28:
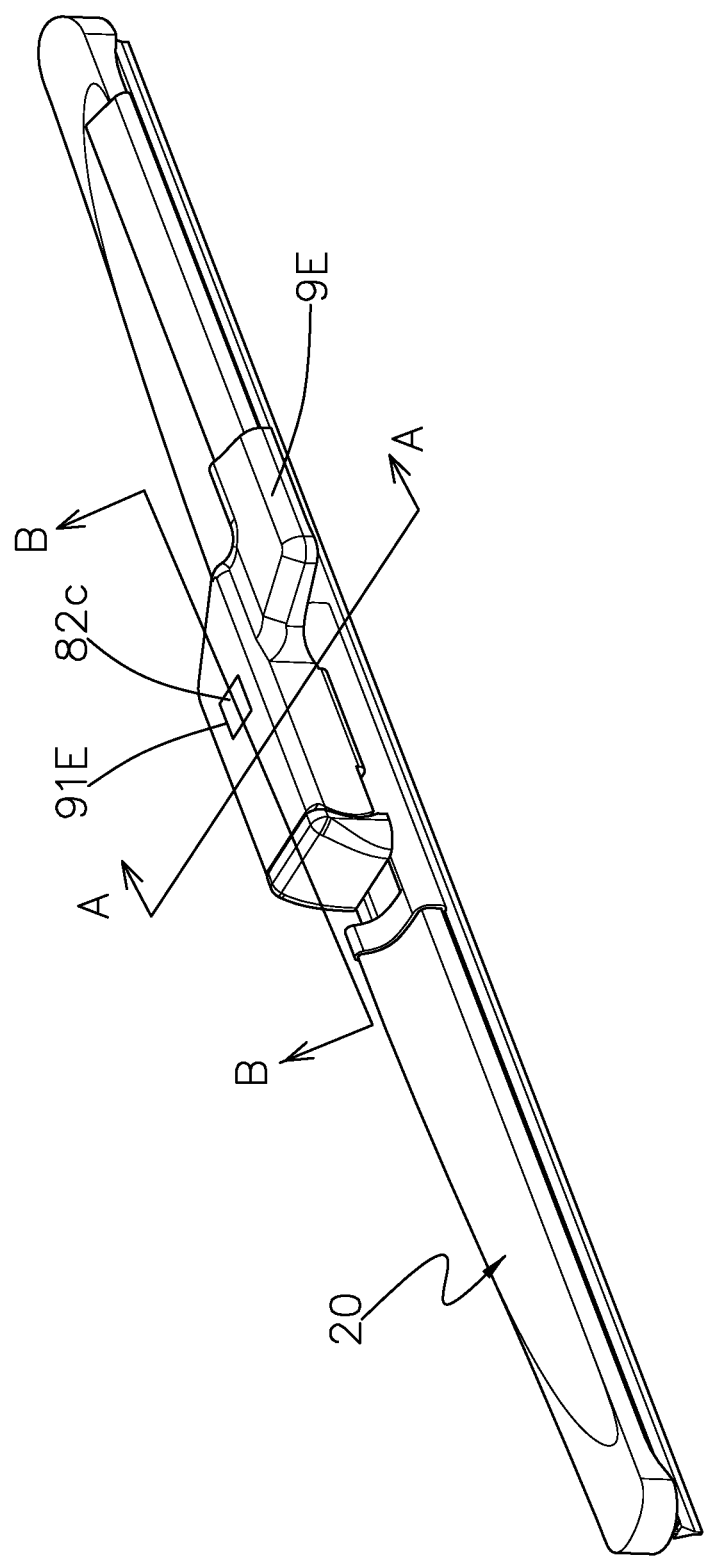
FIG. 28 is a perspective combination view of FIG. 27.
Figure 28A:
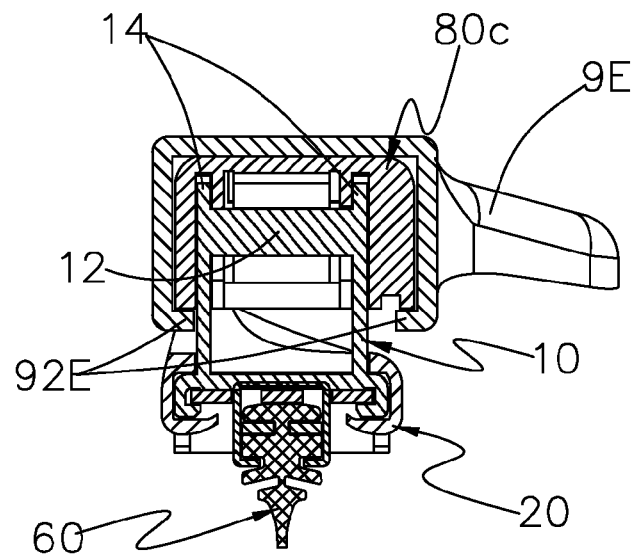
FIG. 28A is a sectional view A-A of FIG. 28.
Figure 28B:
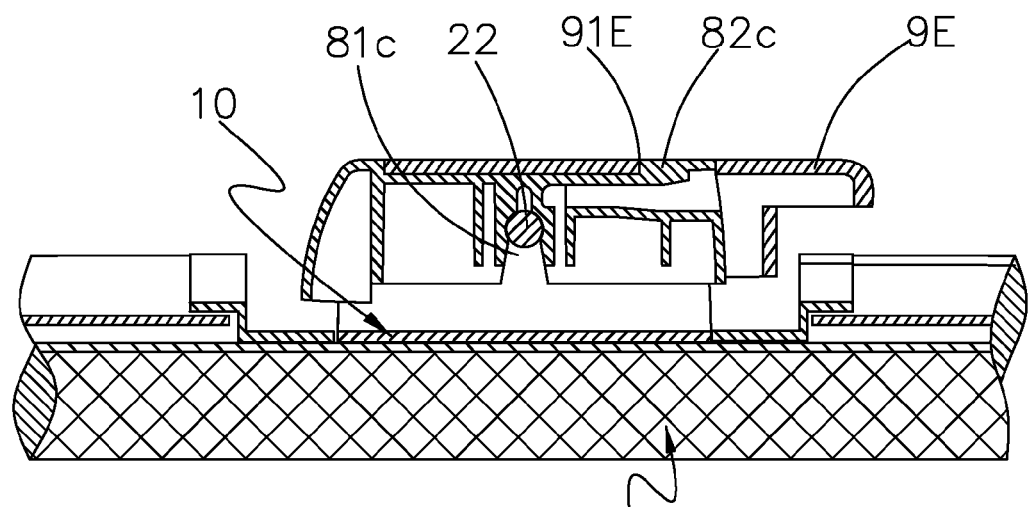
FIG. 28B is a sectional view B-B of FIG. 28.

As shown in FIG. 27, the 3rd connecting adaptor 80*c* is fit into the pivot socket 10, and positioned by locking the column 12 of the pivot socket 10 into its slot 81*c*, and inserting the trough 84*c* of the 3rd connecting adaptor into the support wall of the pivot socket 10 when the 3rd connecting adaptor is assembled with the pivot socket 10.

As shown in FIG. 27, 28, and FIGS. 28A and 28B, this invention can be compatible with one existing wiper arm via the said 3rd connecting adaptor 80*c*. The said wiper arm 9E, whose front end cross section is in U shape with its opening downward, is provided with a clamp hole 91E at its top surface, and barbs 92E at the bottom of its both side wall. When assembled, the wiper arm 9E is fit into the 3rd connecting adaptor 80*c* from the one side of the 3rd connecting adaptor where the resilient boss 82*c* is provided, enabling the barb 92E at the bottom of the wiper arm 9E to reach the bottom of the 3rd connecting adaptor to prevent the wiper arm 9E from separating upwardly. When the wiper arm 9E is fit in place, the resilient boss 82*c* on the 3rd connecting adaptor will be locked into the clamp hole 91E of the wiper arm 9E so as to prevent the wiper arm 9E from separating in forward, backward, left and right directions. In this way, the wiper arm 9E can be connected with the wiper blade. When the wiper arm 9E is to be disassembled, the resilient boss 82*c* of the 3rd connecting adaptor is pressed downward to separate it from the clamp hole 91E of the wiper arm 9E. At that moment, the wiper arm 9E can be pulled out to separate it from the wiper blade.

Figure 29:
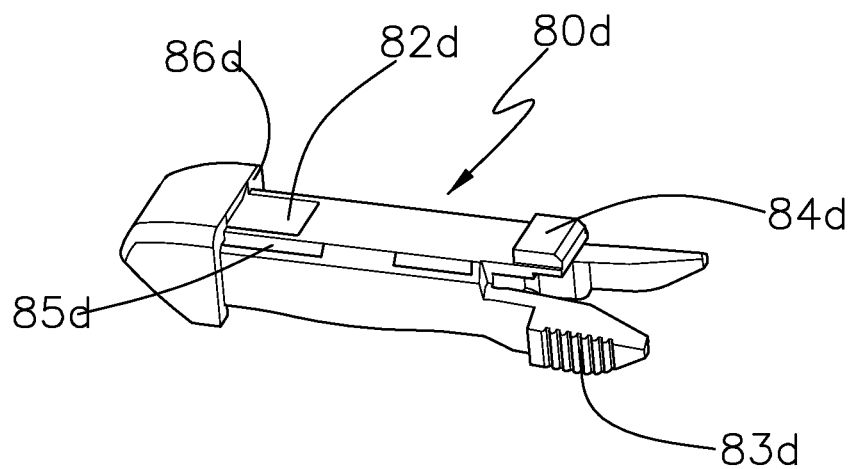
FIG. 29 is a perspective schematic drawing of the 4th connecting adaptor of the present invention.
Figure 30:
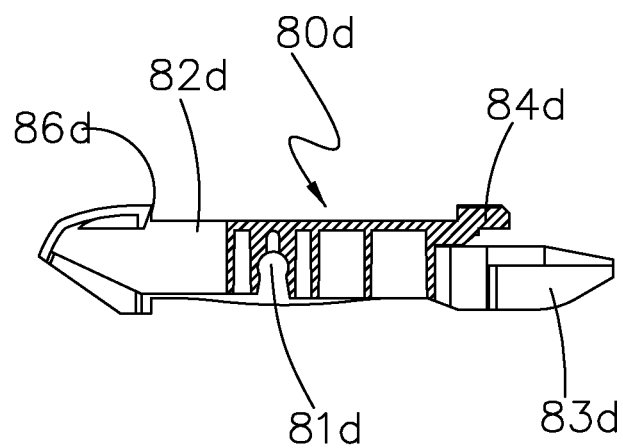
FIG. 30 is a sectional view of the 4th connecting adaptor of the present invention.

The 4th connecting adaptor 80d structure of this invention is shown in FIGS. 29 and 30.

The said 4rd connecting adaptor 80d which is a hollow body with its lower part open is provided with slot 81d with downward opening, and with slot 82d at the front end of the top wall. And a blocking wall is provided at the front of the slot 82d. The resilient clamp stand 83d is provided at both sides of the 4th connecting adaptor 80d, and resilient boss 84d at the top wall. Apart from their own elastic force deriving from materials, the resilient clamp stand 83d and resilient boss 84d gains additional elastic force in traditional way where only one side of the boss is connected with the main body. Two troughs 85d are provided at the top surface of the 4rd connecting adaptor 80d.

Figure 31:
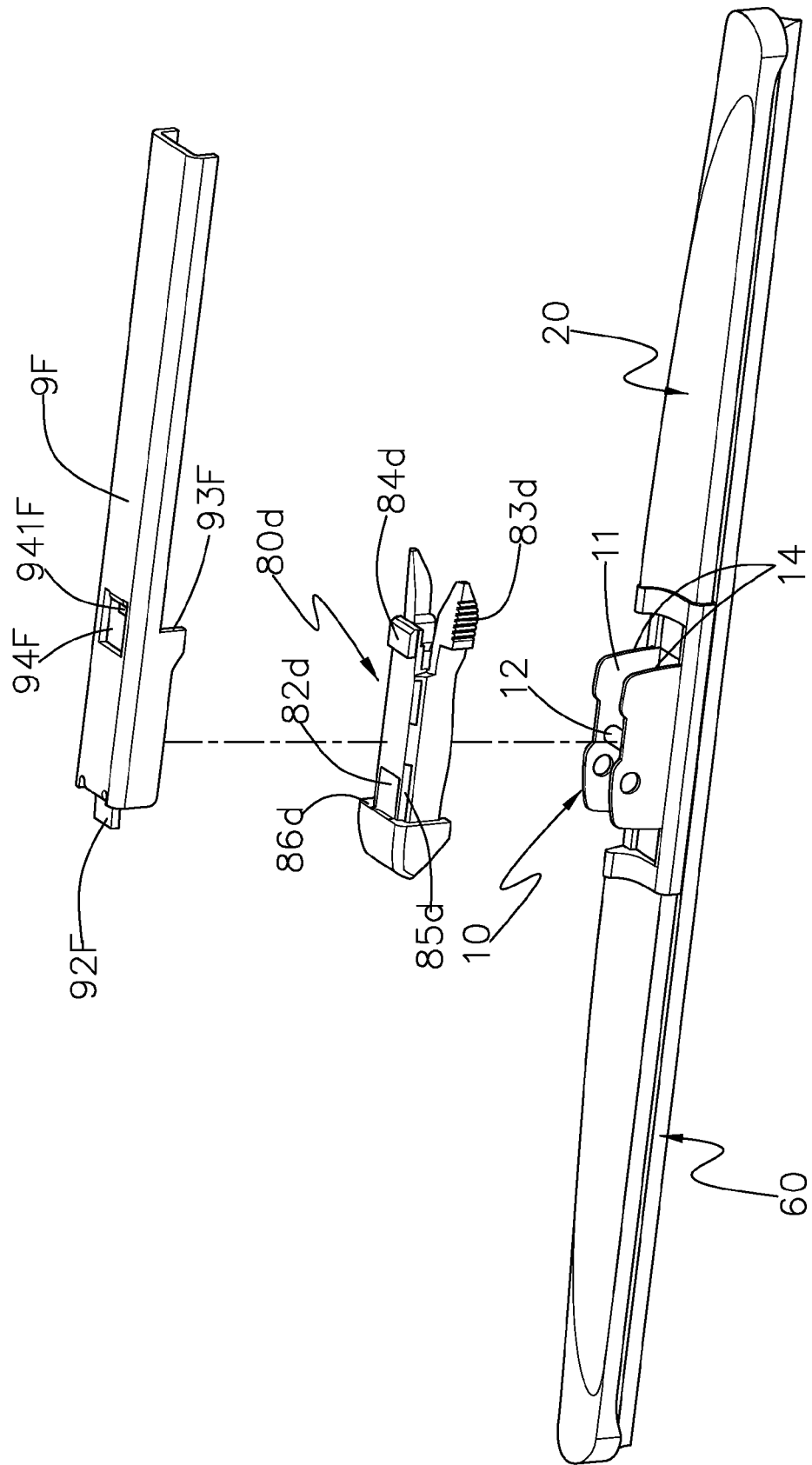
FIG. 31 is a perspective exploded view of connection of the 4th connecting adaptor with other parts of the wiper blade and one wiper arm of the present invention.
Figure 32:
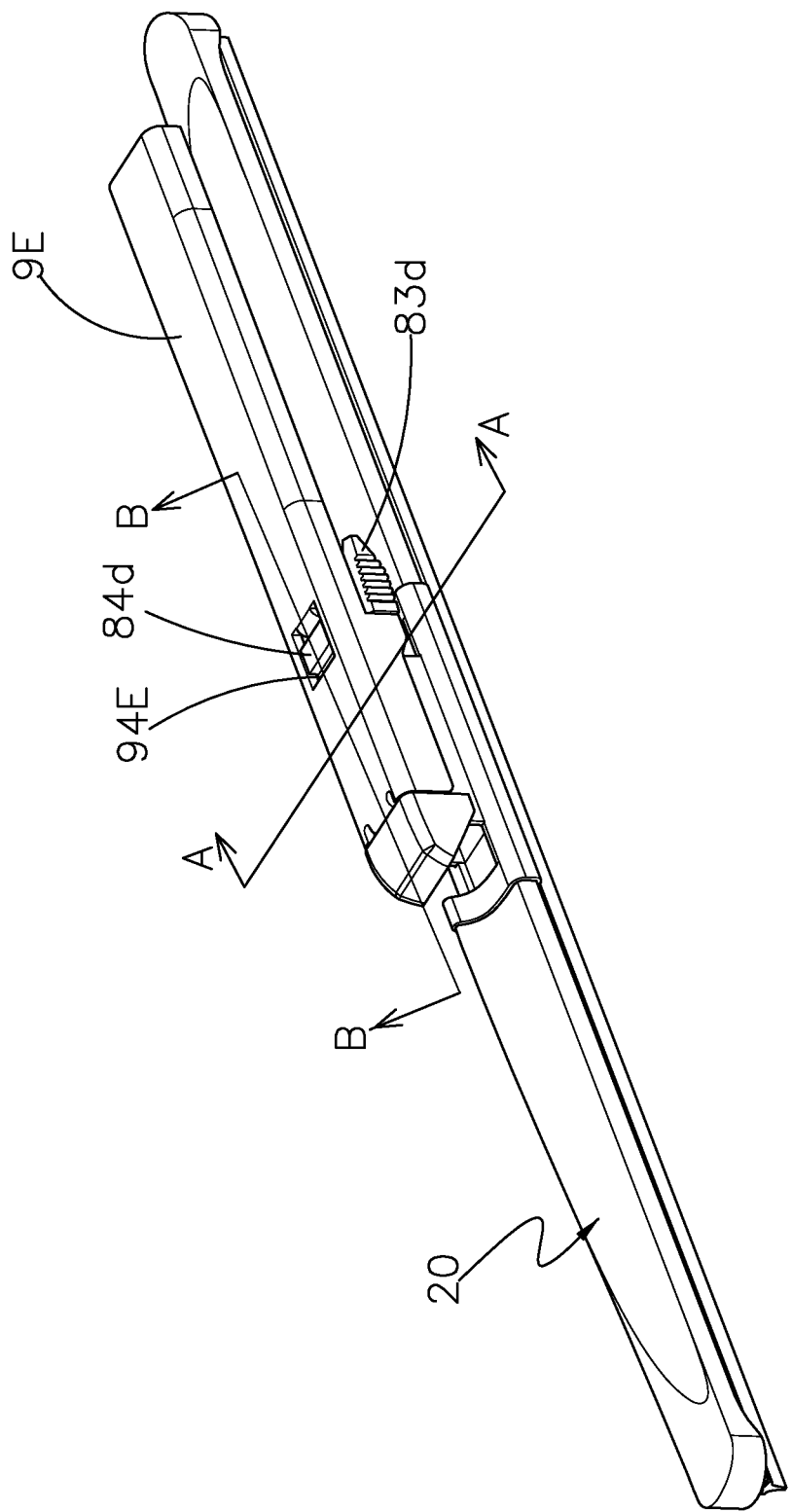
FIG. 32 is a perspective combination view of FIG. 31.
Figure 32A:
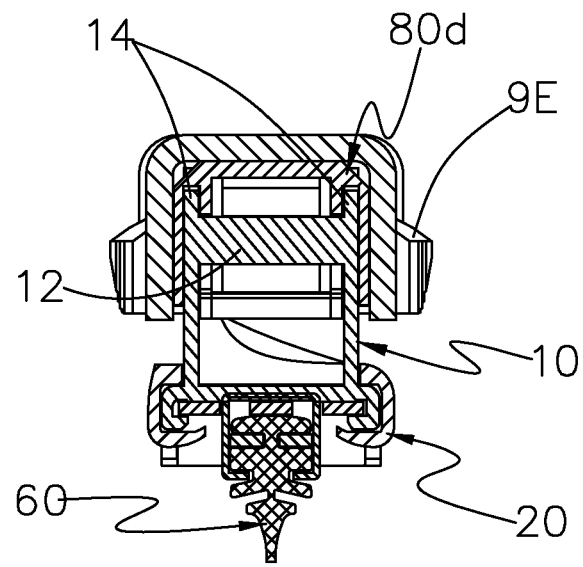
FIG. 32A is a sectional view A-A of FIG. 32.
Figure 32B:
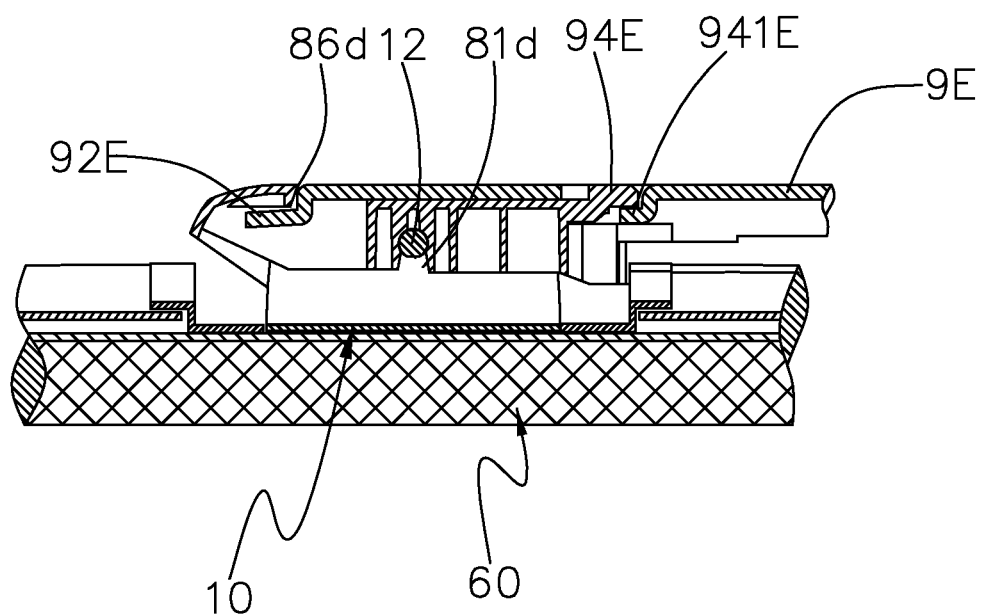
FIG. 32B is a sectional view B-B of FIG. 32.

Based on FIGS. 31 and 32B, the 4th connecting adaptor is fit into the pivot socket 10, and positioned by locking the column 12 of the pivot socket 10 into the slot 81d of the connecting adaptor, and inserting the trough 85d of the connecting adaptor 80d into the support wall 14 of the pivot socket 10 when the 4th connecting adaptor is assembled with the pivot socket 10.

As shown in FIG. 31, 32, and FIGS. 32A and 32B, this invention can be compatible with one existing wiper arm 9F structure via the said 4th connecting adaptor 80d. The said wiper arm 9E, whose cross section is in U shape with its opening downward, is provided with a bump 92F at its front end to match up with the slot 82d of the 4th connecting adaptor, and clamping surface 93F at its both side wall to match up with the resilient clamp stand of the 4th connecting adaptor, and clamp hole 94F, which is provided with barb 941F to match up with the resilient boss 84d of the 4th connecting adaptor, is provided at the top surface of the wiper arm 9F. When assembled, the wiper arm 9F is fit into the 4th connecting adaptor 80d from the top, enabling the bump 92F at the front end surface of the wiper arm 9F to insert into the slot 82d of the 4th connecting adaptor and press the back end of the wiper arm 9F to lock the resilient clamp stand 83d into the clamp surface 93F of the wiper arm 9F, and the resilient boss 84d into the clamp hole 94F of the wiper arm 9F at the barb 941F. In this way, the wiper arm 9F can be connected with the wiper blade. The said bump 92F matches up to the 4th connecting adaptor to prevent the wiper arm 9F from breaking loose upward; front-end surface of the said wiper arm matches up to the blocking wall 86d of the 4th connecting adaptor 80d, and the resilient boss 83d to the clamp surface 93F, and the resilient boss 84d to the barb 941F to prevent the wiper arm 9F from breaking loose in forward and backward direction; The said wiper arm is enabled to be positioned in the left or right direction by matching up its U-shape wall with the both sides of the 4th connecting adaptor.

When the wiper arm 9F is to be disassembled, the resilient clamp stand 83d at both sides of the 4th connecting adaptor is pressed against towards the middle to separate it from the clamp surface 93F of the wiper arm 9F. At that moment, the wiper arm 9F can be turned up to separate the clamp hole 94F of the wiper arm 9F from the resilient boss 84d of the 4th connecting adaptor, and to pull its bump 92F out of the slot 82d. In this way, the wiper arm 9F can be separated from the wiper blade.

Figure 33:
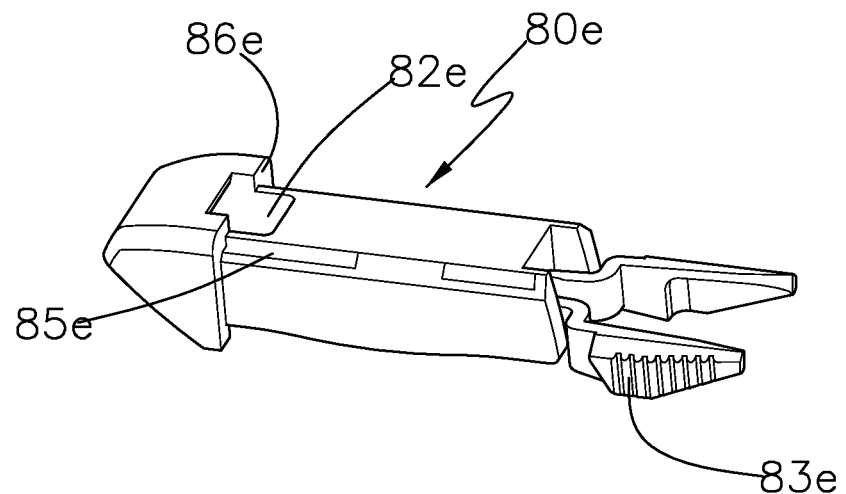
FIG. 33 is a perspective schematic drawing of the 5th connecting adaptor of the present invention.
Figure 34:
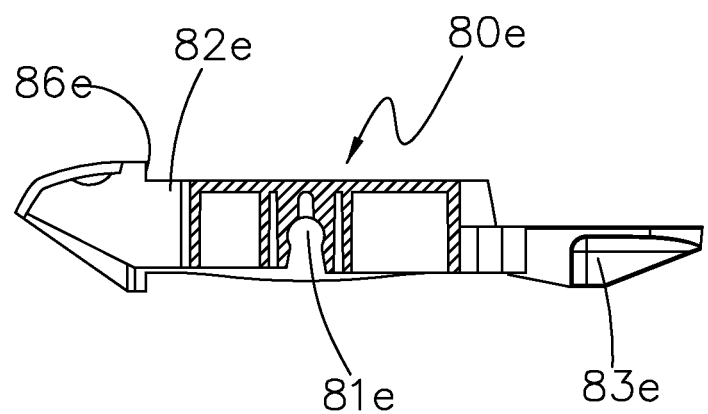
FIG. 34 is a sectional view of the 5th connecting adaptor of the present invention.

The 5th connecting adaptor 80e structure of this invention is shown in FIGS. 33 and 34.

The 5th connecting adaptor 80e, which is also a hollow body with its lower part open, is provided with a slot 81e with downward opening, and with groove 82e at the front end of its top wall. The blocking wall 86e is formed into the front of the groove 82e. The resilient clamp stands 83e are also provided at the both sides of the 5th connecting adaptor 80e. Additionally, two troughs 85e are provided at the top surface of the 5th connecting adaptor 80e. Comparing with the above-mentioned 4th connecting adaptor 80d, there is no presence of the resilient boss in this preferred embodiment.

As the said 5th connecting adaptor 80e is similar to the 4th connecting adaptor 80e in terms of structure, it is assembled with the pivot socket 10 in the same way as that in the above. There is, therefore, no need to go into details.

Figure 35:
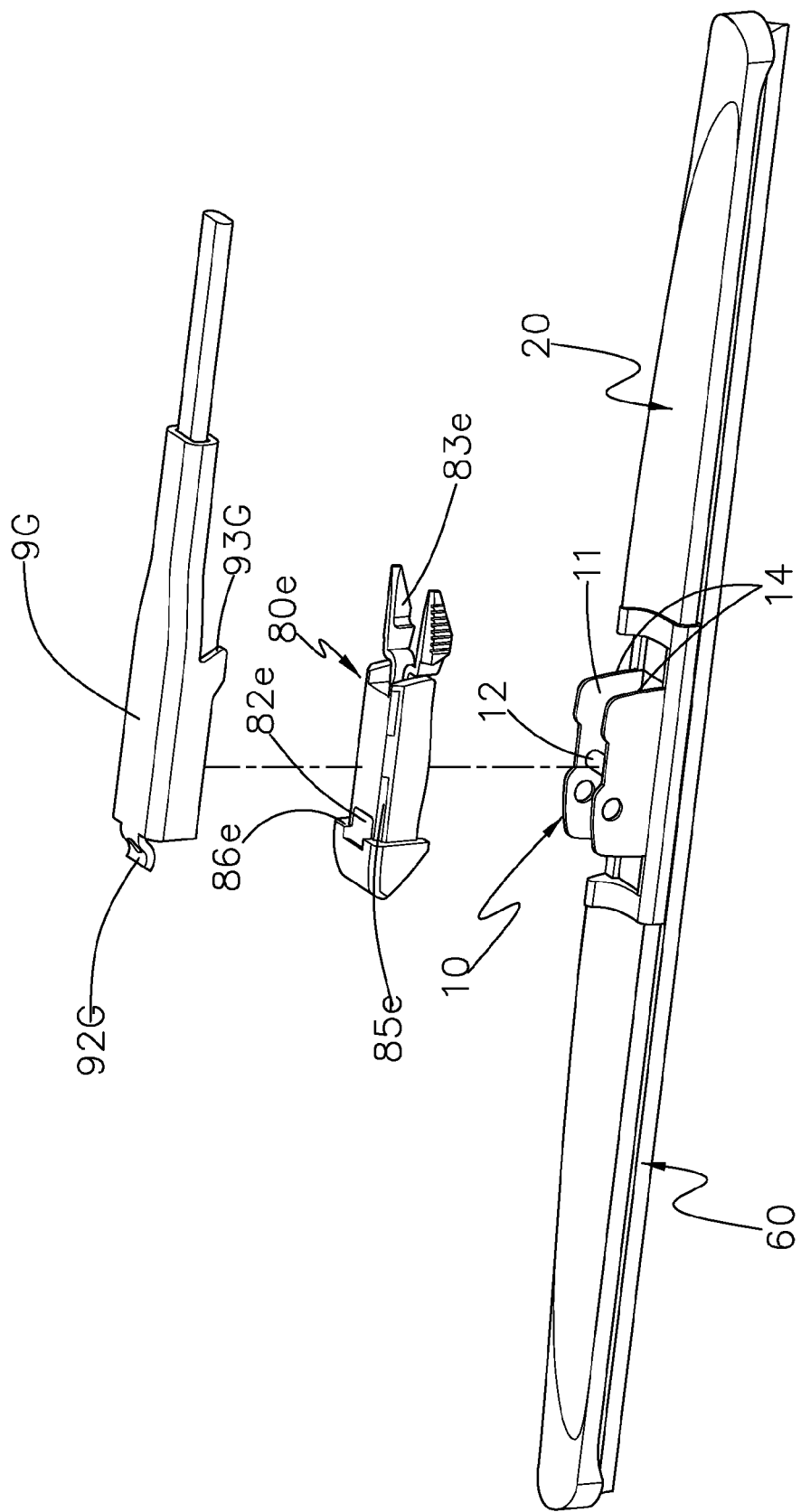
FIG. 35 is a perspective exploded view of connection of the 5th connecting adaptor with other parts of the wiper blade and one wiper arm of the present invention.

As shown in FIG. 35, this invention can be compatible with one existing wiper arm 9G structure via the said 5th connecting adaptor 80e. The said wiper arm 9G, whose front-end cross section is in U shape with its opening downward, is provided with a bump 92G at its front end surface to match up to the groove 82e of the 5th connecting adaptor 80e, and with clamp surface 93G to match up to the resilient clamp stand 83e of the 5th connecting adaptor at both side walls. To further their matching well, the matching surface where the said resilient clamp stand 83e meets the clamp surface 93G is a slope. As the said wiper arm 9G is assembled with the 5th connecting adaptor 80e in the way similar to that of assembly of the 5th connecting adaptor 80 with the wiper arm 9F, there is, therefore, no need to go into details.

Figure 36:
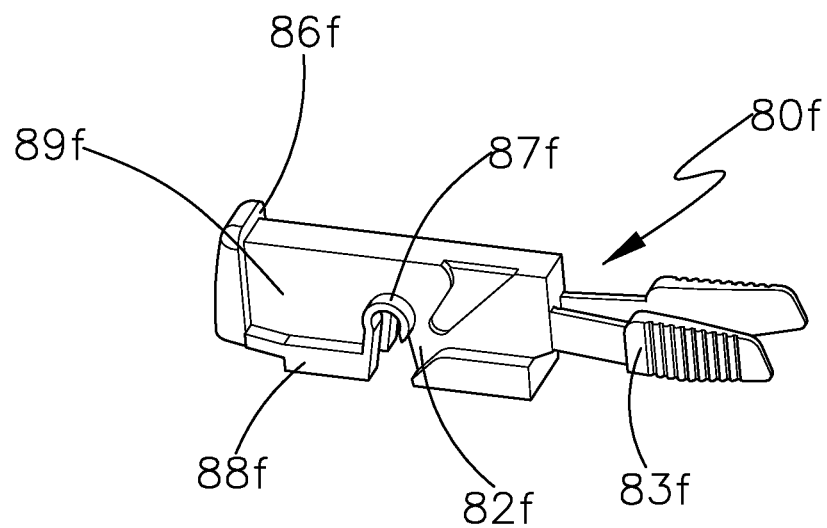
FIG. 36 is a perspective schematic drawing of the 6th connecting adaptor of the present invention.

The 6th connecting adaptor 80f structure of this invention is shown in FIG. 36.

The said 6th connecting adaptor 80f, which is a block body, is provided with a slot 81f with downward opening; a groove 82f is formed into the back side of the slot 81f to access to the latter; and a resilient boss 87f is formed into the front of the groove 82f. The said 6th connecting adaptor 80f is provided with the resilient clamp stand 83f at its both sides. Additionally, stepped surfaces are formed into the both side surfaces of the said 6th connecting adaptor, viz, the bigger lower stepped surface 88f and smaller upper stepped surface 89f. Also, there is a blocking wall 86f formed in the front.

Figure 37:
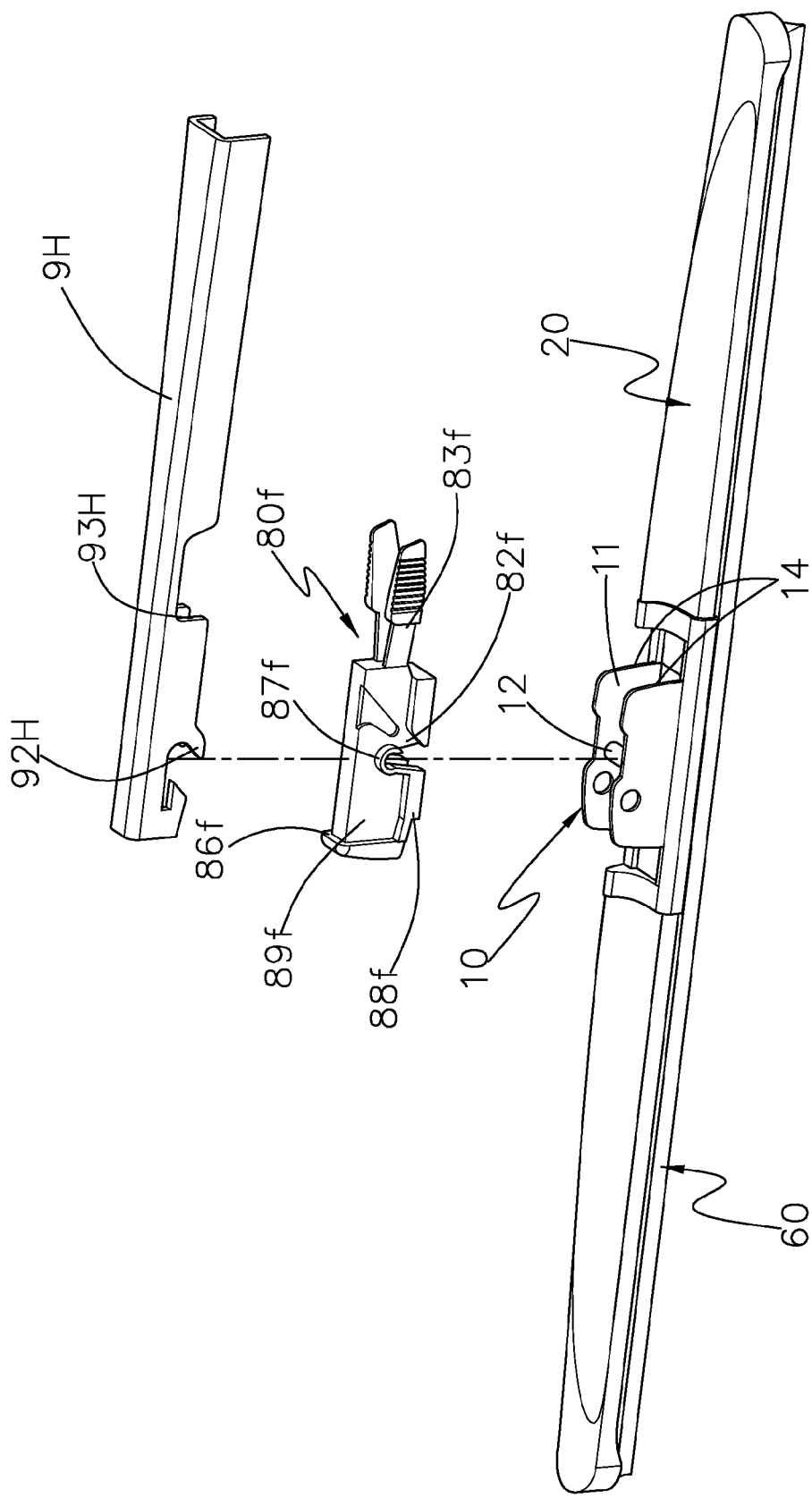
FIG. 37 is a perspective exploded view of connection of the 6th connecting adaptor with other parts of the wiper blade and one wiper arm of the present invention.
Figure 38:
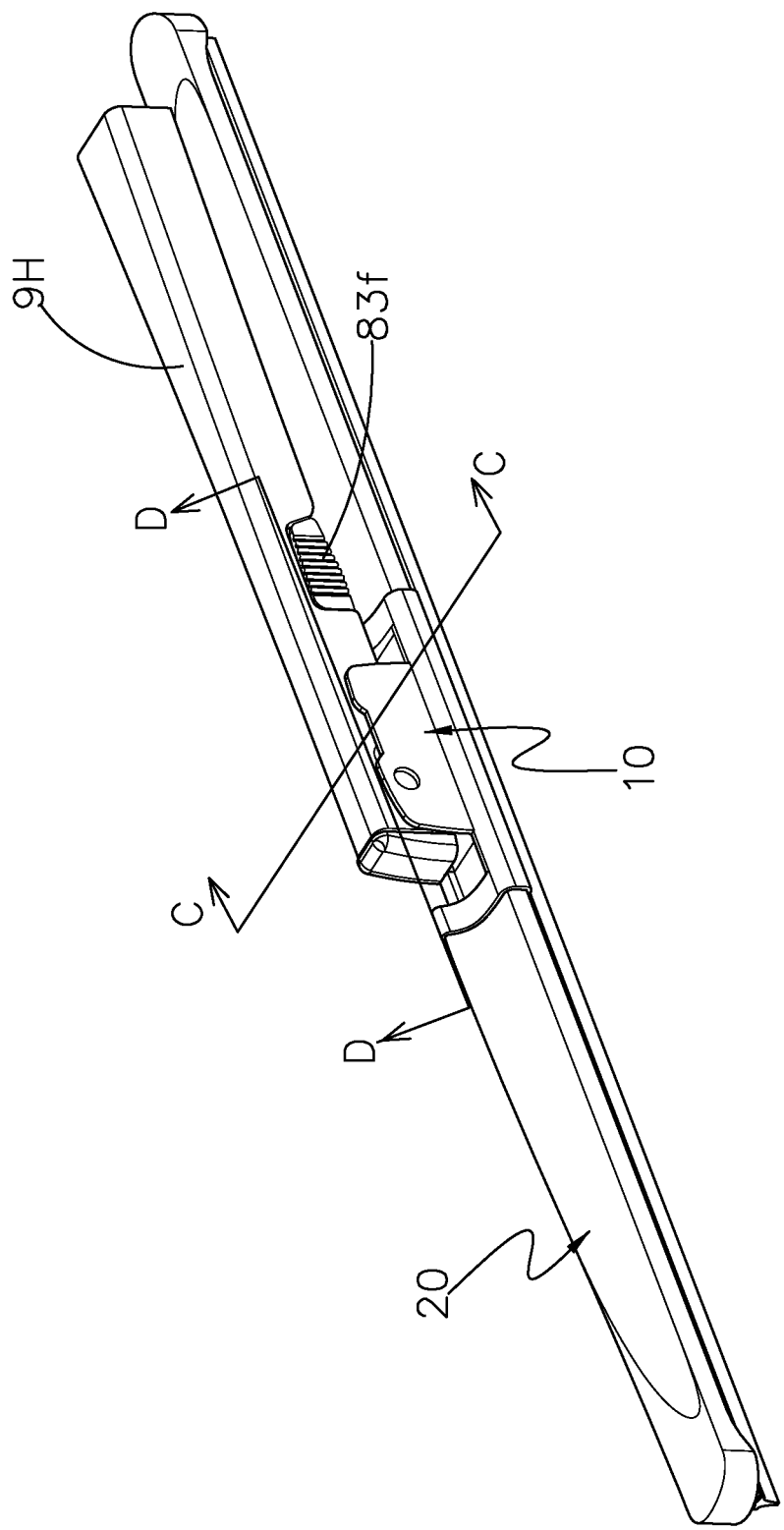
FIG. 38 is a perspective combination view of FIG. 37.
Figure 38A:
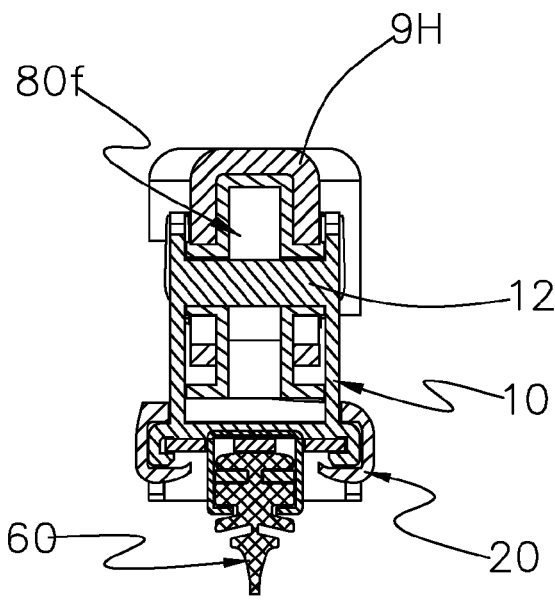
FIG. 38A is a sectional view C-C of FIG. 38.
Figure 38B:
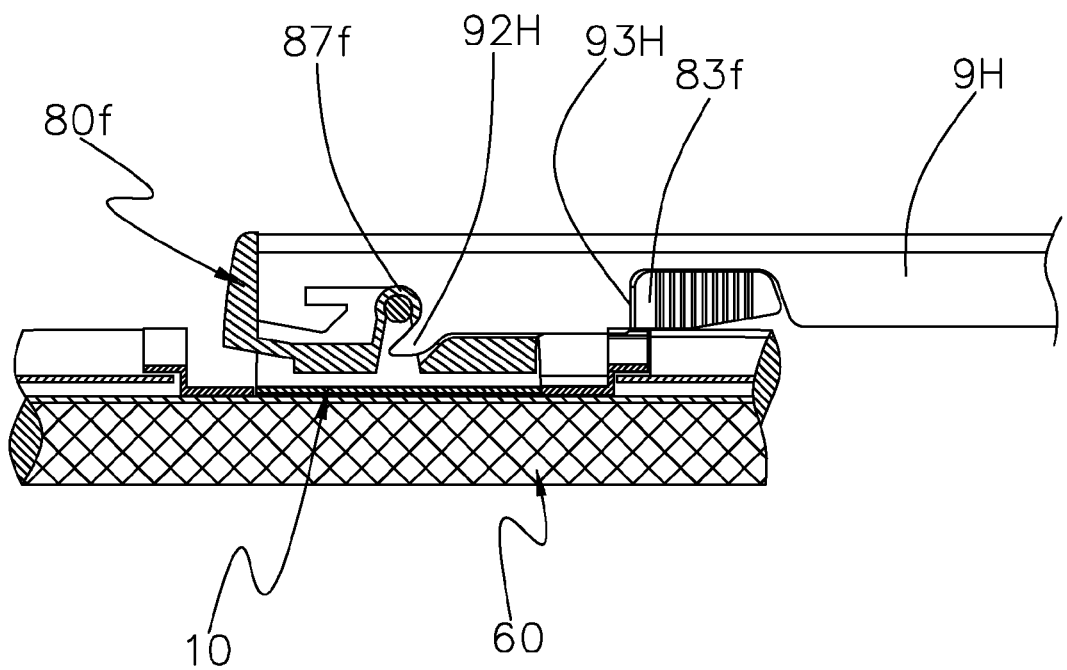
FIG. 38B is a sectional view D-D of FIG. 38.

Based on FIGS. 37 and 38B, the 6th connecting adaptor 80f is fit into the inner notch 11 of the pivot socket 10, and positioned by locking the column 12 of the pivot socket into the slot 81f on the adaptor and matching the lower stepped surface of the 6th connecting adaptor with the inner notch 11 of the pivot socket 10.

As shown in FIGS. 37, 38, 38A and 38B, the said the 6th connecting adaptor 80f can be compatible with one existing wiper arm 9H structure. The cross section of the said wiper arm 9H is in U shape with downward opening, and a bump 92H is provided at the lower part of both sides of the cross section to match up with the groove 82f of the 6th connecting adaptor, and the clamp surface 93H at the lower part of both side walls to match up with the resilient clamp stand 83f of the 6th connecting adaptor. When assembled, the wiper arm 9H is fit into the 6th connecting adaptor from the top, enabling the bump 92H of the wiper arm 9H to insert into the groove 82f of the 6th connecting adaptor, and then the back of the wiper arm 9H is pressed against to lock the resilient clamp stand 83f on the 6th connecting adaptor into the clamp surface 93H of the wiper arm 9H as well as make the blocking wall 86f at the front end of the 6th connecting adaptor lean against the front-end surface of the wiper arm 9H, which enables the wiper arm 9H to connect with the wiper blade. However, the said bump 92H fits into the boss 87f of the 6th connecting adaptor 80f to prevent the wiper arm 9H from breaking loose upward; front-end surface of the said wiper arm 9H matches up to the blocking wall 86f of the 6th connecting adaptor 80f, and the resilient clamp stand 83f to the clamp surface 93H to prevent the wiper arm 9F from breaking loose in forward and backward direction; The said wiper arm is enabled to be positioned in the left or right direction by matching up its U-shape wall with the upper stepped surface of both sides of the 6th connecting adaptor 80f. When the wiper arm 9H is to be disassembled, the resilient clamp stand 83f at both sides of the 6th connecting adaptor 80f is pressed against towards the middle to separate it from the clamp surface 93H of the wiper arm 9H. At that moment, the wiper arm 9H can be pulled out toward the diagonal direction to separate it from the wiper blade.

The invention claimed is:

1. A boneless wiper blade comprising a pivot socket, two end ferrules, a spring steel sheet and a rubber strip, wherein the spring steel sheet is used to support and fix the rubber strip, and the pivot socket, on which a connecting adaptor is installed to connect with wiper arms, is installed on a center of the spring steel sheet and the rubber strip, with the two end ferrules mounted at both ends of the spring steel sheet and the rubber strip; characterized in that a crest section of each end ferrule is eccentrically set so that a longer side of the crest section forms an inwardly curved surface; the crest section and the curved surface is integrated as a smooth curve; an externally curved surface, whose cross section is upwardly convex arc-shaped and integrated with the crest section and the curved surface, is provided at an outer end of each end ferrule; the spring steel sheet is in parabolic shape with a gradually changing curvature, and has no arch section joint; one piece of the spring steel sheet is placed on the rubber strip which features first grooves and second grooves longitudinally at both ends; two spacers are mounted into the first grooves, and barbs of several clips are threaded through square holes in the spring steel sheet, and fitted into the second grooves to assemble the spring steel sheet, the rubber strip and the spacers together.

2. A boneless wiper blade as claimed in claim 1, characterized in that each of said end ferrules has inwardly kinked grooves at its lower part to fit onto both ends of the spring steel sheet; the grooves have sticking points at their external ends, which fit into gaps at both sides of both ends of the spring steel sheet; the end ferrules have downwardly extended higher sides at their respective external ends.

3. A boneless wiper blade as claimed in claim 2, characterized in that the pivot socket has two walls, between which an inner groove is formed, and has a column; the pivot socket has a slot and slot points at a lower part, and the slot fits onto both sides of a middle part of the spring steel sheet; the spring steel sheet has a slot at its middle part to fit onto the slot point at the lower part of the pivot socket.

4. A boneless wiper blade as claimed in claim 3, characterized in that said pivot socket can be removably connected to a first connecting adaptor, wherein the adaptor has a slot with a downward opening provided at its lower part to match the column of the pivot socket; a square hole is provided at a back end within a notch which is formed within the first connecting adaptor, and a round hole is provided at an upper wall of the square hole to match a flat-type wiper arm; a gap is provided nearly at an upper part of the first connecting adaptor, and a clamp column which matches the gap is provided on a connecting adaptor cover which is pivoted to the adaptor, and also a block piece is provided at an inner side of the cover to fix a hook-type wiper arm; a wedge is provided in front of the slot in the first connecting adaptor.

5. A boneless wiper blade as claimed in claim 4, characterized in that a socket cover is provided over the pivot socket, which is, in turn, covered by a square hole provided at a middle of the socket cover, and both ends of the socket cover are formed into curved surfaces similar to that of inside ends of the end ferrules to cover such inside ends; a hook section is provided at a lower part of the socket cover to hook a lower part of the pivot socket and end ferrules.

* * * * *